(12) United States Patent
Yajima

(10) Patent No.: US 10,042,171 B2
(45) Date of Patent: Aug. 7, 2018

(54) HEAD MOUNTED DISPLAY DEVICE, CONTROL METHOD FOR HEAD MOUNTED DISPLAY DEVICE, AND COMPUTER PROGRAM

(71) Applicant: SEIKO EPSON CORPORATION, Tokyo (JP)

(72) Inventor: Kenro Yajima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 86 days.

(21) Appl. No.: 14/995,696

(22) Filed: Jan. 14, 2016

(65) Prior Publication Data

US 2016/0216520 A1  Jul. 28, 2016

(30) Foreign Application Priority Data

Jan. 27, 2015 (JP) .................. 2015-013125

(51) Int. Cl.
  *G09G 5/00* (2006.01)
  *G02B 27/01* (2006.01)
  *G06F 3/01* (2006.01)

(52) U.S. Cl.
  CPC ..... *G02B 27/0179* (2013.01); *G02B 27/0172* (2013.01); *G06F 3/011* (2013.01); *G02B 2027/0134* (2013.01); *G02B 2027/0138* (2013.01); *G02B 2027/0181* (2013.01)

(58) Field of Classification Search
  CPC .. G09G 5/00; G06F 3/02; G02B 27/22; G02F 1/133; H04N 13/00; H04N 13/02; H04N 13/04; A61B 1/04
  See application file for complete search history.

(56) References Cited

U.S. PATENT DOCUMENTS

| | | | |
|---|---|---|---|
| 2004/0140949 A1 | 7/2004 | Takagi | |
| 2010/0225566 A1* | 9/2010 | Sato | G02B 27/017 345/8 |
| 2013/0174205 A1* | 7/2013 | Jacobsen | H04N 21/43637 725/81 |
| 2013/0234914 A1* | 9/2013 | Fujimaki | G06F 3/011 345/8 |
| 2015/0277121 A1* | 10/2015 | Fridental | G02B 27/0101 348/54 |
| 2015/0287158 A1* | 10/2015 | Cerny | G06F 3/013 345/553 |
| 2016/0041391 A1* | 2/2016 | Van Curen | G02B 27/0172 345/633 |

FOREIGN PATENT DOCUMENTS

| | | |
|---|---|---|
| JP | 2004-186740 A | 7/2004 |
| JP | 2012-080236 A | 4/2012 |
| JP | 2014-192550 A | 10/2014 |
| WO | 2014/156033 A1 | 10/2014 |

* cited by examiner

Primary Examiner — Pegeman Karimi
(74) Attorney, Agent, or Firm — Oliff PLC

(57) ABSTRACT

A transmission type head mounted display device includes an imaging unit that images an outside scene and an image display unit that is capable of transmitting the outside scene. An imaging range of the imaging unit is set based on a set distance from the image display unit set based on a focal length of a user and an estimated field of view estimated as a field of view of the user who wears the image display unit.

9 Claims, 14 Drawing Sheets

HEAD MOUNTED DISPLAY DEVICE, CONTROL METHOD FOR HEAD MOUNTED DISPLAY DEVICE, AND COMPUTER PROGRAM

BACKGROUND

1. Technical Field

The present invention relates to a head mounted display device.

2. Related Art

A head mounted display device (HMD) that is a display device mounted on a head is known. The head mounted display device, for example, generates an image light using a liquid crystal display and a light source, guides the generated image light to the eyes of a user using a projection optical system and a light guide plate, and causes the user to visually recognize a virtual image. Of the head mounted display device, there are two types: a transmission type device with which the user can visually recognize an outside scene in addition to the virtual image and a non-transmission type device with which the user cannot visually recognize the outside scene. There are two types of the transmission type head mounted display device: an optical transmission type head mounted display device and a video transmission type head mounted display device. In addition, there is also a head mounted display device including a camera that captures an image of an outside scene.

In JP-A-2014-192550, a technology is disclosed, in which, in a head mounted display device which causes the right and left eyes of a user to visually recognize separate images, a stereoscopic image is visually recognized by the user as a three-dimensional image at a position separated by a predetermined distance from the user by forming a convergence angle between the image visually recognized by the right eye and the image visually recognized by the left eye. In JP-A-2004-186740, a technology is disclosed, in which, in a transmission type head mounted display device, a clear image can be visually recognized by the user even in a case of visually recognizing the outside scene in the vicinity of the user by matching a light axis of an imaging system including an imaging unit that captures an image of an outside scene with a light axis of a display system that displays the image. In JP-A-2012-80236, an electronic device that displays information relating only to a subject that has been imaged within a predetermined distance from an imaging device as an image to be overlapped on the imaged subject is disclosed.

However, in JP-A-2014-192550 and JP-A-2012-80236, setting of the imaging unit based on the relationship between a field of view of the user and a specification of the imaging unit such as an angle of view of the imaging unit is not disclosed while the visual recognition of the three-dimensional image by the user is disclosed. In addition, in JP-A-2004-186740, the setting of the imaging unit based on the relationship between a field of view of the user and a specification of the imaging unit is not disclosed while the matching of a light axis of an imaging system with a light axis of a display system is disclosed. In JP-A-2014-192550, JP-A-2004-186740, and JP-A-2012-80236, the relationship between a field of view of the user, an angle of view or a direction of the imaging unit, and a region where the image is displayed is not taken into consideration, and thus, it has been desired to set a specification of an imaging unit with these factors being taken into consideration. In addition, in the image processing technology in the related art, it has been desirable to reduce the size, to reduce the cost, to make it easy to manufacture, and to improve the usability.

SUMMARY

An advantage of some aspect of the invention is to solve at least a part of the problems described above, and the invention can be implemented as the following forms.

(1) An aspect of the invention provides a transmission type head mounted display device. This type of head mounted display device includes: an imaging unit that images the outside scene; and an image display unit that is capable of transmitting the outside scene. An imaging range of the imaging unit is set based on a set distance from the image display unit set based on a focal length of a user and an estimated field of view estimated as a field of view of the user who wears the image display unit. According to this type of head mounted display device, in a case where the image which is in association with the position of the subject included in the imaged outside scene is displayed on the image display unit, in the range in which the user can visually recognize the outside scene clearly, the image which can be visually recognized clearly by the user is displayed on the image display unit. In addition, by setting the estimated field of view as a range of a field of view that the user needs, the imaging unit does not need to capture the image of the unnecessary range of the outside scene, and thus, it is possible to provide the head mounted display including the imaging unit that meets the needs of the user.

(2) In the head mounted display device of the aspect, the estimated field of view may be a region set with a position of the field of view set as a position of the eyes of the user as a center. According to the head mounted display device of this aspect, since the estimated field of view is set as a field of view with a position of the eyes of the user as a center, it is possible to provide the imaging device suitable for the field of view of the user.

(3) In the head mounted display device of the aspect, the estimated field of view may be set as a stable fixation field of the user. According to the head mounted display device of this aspect, the image can be displayed on the image display unit in the range in which the user can visually recognize the subject without difficulty by eyeball movement or head movement, and only the range necessary for the user is imaged. Thus, it is possible to reduce a burden of image processing.

(4) In the head mounted display device of the aspect, the estimated field of view may be determined based on a right eye set field of view of which a center is a set right eye position which is set as a position of the right eye of the user who wears the image display unit and a left eye set field of view of which a center is a set left eye position which is set as a position of the left eye of the user who wears the image display unit. According to the head mounted display device of this aspect, since the set field of view is set while the right eye and the left eye are distinguished, the image in which the distance is also taken into consideration can be visually recognized by the user like a three-dimensional image to be stereoscopically recognized by the user by forming a parallax. Therefore, the usability of the user is improved compared to the case of a single eye.

(5) In the head mounted display device of the aspect, the image display unit may include an image display region in which an image can be displayed; and in a case where a region formed by the estimated field of view at the position of the image display region with the estimated position of the eyes of the user as a base point is greater than the image display region, the imaging range may be set based on the image display region. According to the head mounted display device of this aspect, in the range in which the user can visually recognize the outside scene clearly and the image can be displayed on the image display unit, the image which can be visually recognized by the user clearly is displayed on the image display unit. Therefore, the imaging unit does not need to capture the image of the unnecessary range of the outside scene, and thus, it is possible to provide the head mounted display device including the imaging unit that meets the needs of the user.

(6) In the head mounted display device of the aspect, in a case where the three-dimensional image which is visually recognized by the user is stereoscopically displayed on the image display unit, the head mounted display device may further include a display image setting unit that sets a distance to a display position where a three-dimensional image is visually recognized by the user to be equal to or longer than the set distance. According to the head mounted display device of this aspect, the user does not visually recognize a blurred three-dimensional image. Thus, the usability for the user is improved.

(7) In the head mounted display device of the aspect, the imaging unit may include a plurality of cameras which is mounted on the image display unit; and the imaging range is set by adjusting at least one of angles of view and directions of optical axes of the plurality of cameras. According to the head mounted display device of this aspect, by setting any of the angles of view and the optical axis of the imaging unit, it is possible to cause the clear image to be visually recognized by the user. Therefore, the degree of freedom for arranging the imaging unit is improved and it becomes easy to manufacture the image display unit on which the imaging unit is mounted.

Not all of a plurality of configuration elements in each of the above-described aspect of the invention is essential. In order to achieve a part or all of the effects described herein, a change, a deletion, a substitution with a new other configuration element and a partial deletion of the limiting content can appropriately be performed regarding apart of the plurality of configuration elements. In addition, in order to achieve a part or all of the effects described herein, by combining a part or all of the technical features included in an aspect of the invention described above with a part or all of the technical features included in another aspect of the invention described above, an independent aspect of the invention can be made.

For example, an aspect of the invention can be implemented as a device that includes one or two or more elements among two elements of the imaging unit and the image display unit. That is, the device may or may not include the imaging unit. In addition, the device may or may not include the image display unit. The imaging unit, for example, may capture the image of the outside scene. The image display unit, for example, may be capable of transmitting the image. The imaging range of the imaging unit, for example, may be set based on a set distance from the image display unit set based on a focal length of a user and an estimated field of view estimated as a field of view of the user who wears the image display unit. This device, for example, can be implemented as the head mounted display device, but can also be implemented as another device other than the head mounted display device. According to the aspect like this, it is possible to solve at least one of the various objects such as an improvement and simplification of the operability of the device, an integration of the device, and an improvement of the convenience of the user using the device. Any of the above-described parts or all of the technical features in each aspect of the head mounted display device can be applied to this device.

The invention can be implemented in various forms other than the head mounted display device. For example, the invention can be implemented in the forms of: a control method for the head mounted display device, an information system that includes the head mounted display device, a computer program for implementing the control method for the head mounted display device and the information system, a storage medium that stores the computer program, an information storage apparatus such as a server for distributing the computer program, a data signal incorporated in a carrier wave in which the computer program is included, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of a Head Mounted Display Device

Figure 1:
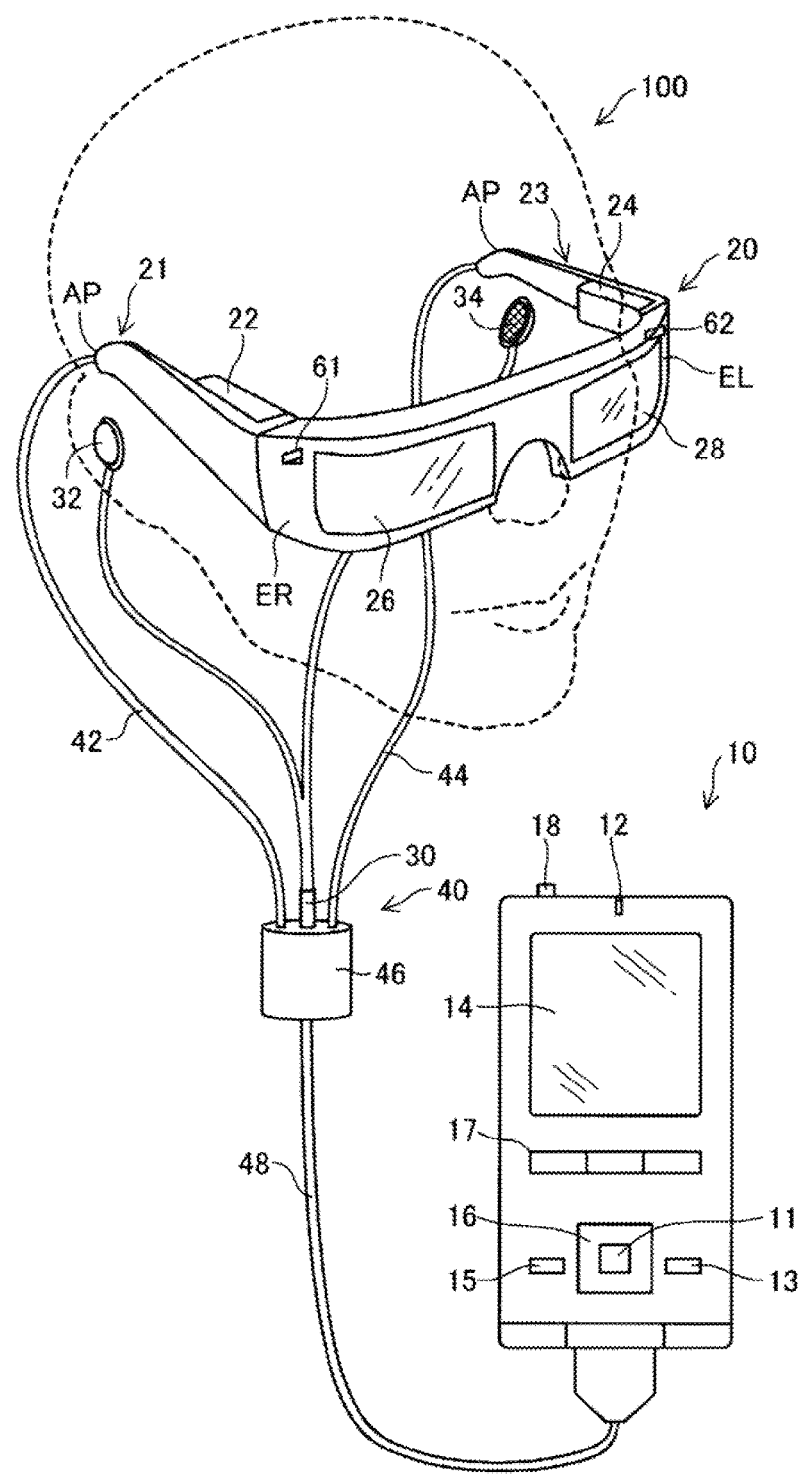
FIG. 1 is an explanatory diagram illustrating an external configuration of a head mounted display device (HMD) in a first embodiment.

FIG. 1 is an explanatory diagram illustrating an external configuration of a head mounted display device 100 (HMD 100) in the first embodiment. The HMD 100 is a display device mounted on a head and is also called as a head mounted display. The HMD 100 in the present embodiment is an optical transmission type head mounted display device with which the user can directly and visually recognize an outside scene when the user visually recognizes a virtual image. In the present specification, the virtual image visually recognized by the HMD 100 by the user is also called "display image" for convenience.

The HMD 100 includes the image display unit 20 that causes the user to visually recognize the virtual image in the state of being mounted on the user's head and a controller 10 that controls the image display unit 20.

The image display unit 20 is a mounting body to be mounted on the user's head and has a glasses shape in the present embodiment. The image display unit 20 includes a right holding portion 21, a right display drive unit 22, a left holding portion 23, a left display drive unit 24, a right optical image display unit 26, a left optical image display unit 28, a first camera 61 and a second camera 62. The right optical image display unit 26 and the left optical image display unit 28 are respectively disposed so as to be positioned in front of the right and left eyes of the user when the user wears the image display unit 20. One end of the right optical image display unit 26 and one end of the left optical image display unit 28 are connected to each other at the position corresponding to the position between the eyebrows of the user when the user wears the image display unit 20.

The right holding portion 21 is a member provided to extend from an end portion ER which is the other end of the right optical image display unit 26 to a position corresponding to a side head of the user at the time when the user wears the image display unit 20. Similarly, the left holding portion 23 is a member provided to extend from an end portion EL which is the other end of the left optical image display unit 28 to a position corresponding to a side head of the user at the time when the user wears the image display unit 20. The right holding portion 21 and the left holding portion 23 hold the image display unit 20 on the head of the user in the form of temples of the glasses.

The right display drive unit 22 and the left display drive unit 24 are disposed on the side facing the user's head at the time when the user wears the image display unit 20. Hereinafter, the right holding portion 21 and the left holding portion 23 will be collectively and simply referred to as a "holding portion", the right display drive unit 22 and the left display drive unit 24 are collectively and simply referred to as a "display drive unit", and the right optical image display unit 26 and the left optical image display unit 28 are collectively and simply referred to as an "optical image display unit".

The display drive units 22 and 24 include liquid crystal displays 241 and 242 (hereinafter, referred to as "LCDs 241 and 242"), projection optical systems 251 and 252, or the like (refer to FIG. 2). Detailed configurations of the display drive units 22 and 24 will be described below. Optical image display units 26 and 28 as optical members include light guide plates 261 and 262 (refer to FIG. 2) and a dimming plate. The light guide plates 261 and 262 are formed of an optically transmissive resin material or the like, and guide the image light output from the display drive units 22 and 24 to the eyes of the user. The dimming plate is a thin plate-shaped optical element and is disposed so as to cover the surface side of the image display unit 20 which is a side opposite to the user's eyes. The dimming plate protects the light guide plates 261 and 262 and suppresses the damage of the light guide plates 261 and 262 or the adhesion of dirt, or the like. In addition, by adjusting the light transmittance of the dimming plate, the amount of external light that enters the user's eyes can be adjusted and then, the ease of the visual recognition of the virtual image can be adjusted. The dimming plate can be omitted.

The first camera 61 and the second camera 62 capture an image of an outside scene. The first camera 61 and the second camera 62 are respectively disposed at different positions on the image display unit 20. The first camera 61 is disposed on an end portion ER which is the other end of the right optical image display unit 26 in a head direction of the user in a case where the user wears the image display unit 20. In addition, similarly, the second camera 62 is disposed on an end portion EL which is the other end of the left optical image display unit 28 in a head direction of the user in a case where the user wears the image display unit 20. In the present embodiment, the first camera 61 and the second camera 62 are respectively disposed in line symmetry against a center line which passes through a position in which one end of the right optical image display unit 26 and one end of the left optical image display unit 28 are connected and which is the center of the image display unit 20. Hereinafter, the first camera 61 and the second camera 62 are collectively referred to as simply the camera 61 and the camera 62. An imaging range of the first camera 61 and an imaging range of the second camera 62 may be different from each other, and in other embodiments, the direction or the position in which the first camera 61 and the second camera 62 are disposed can be variously modified. The cameras 61 and 62 correspond to an imaging unit in aspects of the invention.

The image display unit 20 further includes a connection portion 40 that connects the image display unit 20 to the controller 10. The connection portion 40 includes a main body cord 48 connected to the controller 10, a right cord 42, a left cord 44, and a connection member 46. The right cord 42 and the left cord 44 are cords in which the main body cord 48 is branched into two. The right cord 42 is inserted into a housing of the right holding portion 21 from a distal portion AP in the extending direction of the right holding portion 21, and is connected to the right display drive unit 22. Similarly, the left cord 44 is inserted into a housing of the left holding portion 23 from a distal portion AP in the extending direction of the left holding portion 23, and is connected to the left display drive unit 24. The connection member 46 is provided on the branch point of the main body cord 48 and the right cord 42 and the left cord 44, and has a jack for connecting an earphone plug 30. A right earphone 32 and a left earphone 34 extend from the earphone plug 30.

The image display unit 20 and the controller 10 perform the transmission of various signals via the connection portion 40. To each of the end portion on the opposite side of the connection member 46 in the main body cord 48 and the controller 10, connectors (not illustrated) fitted to each other are provided. The controller 10 and the image display unit 20 are connected to or separated from each other by fitting or releasing the connector of the main body cord 48 to/from the connector of the controller 10. For example, as the right cord 42, the left cord 44, and the main body cord 48, a metal cable or an optical fiber can be adopted.

The controller 10 is a device for controlling the HMD 100. The controller 10 includes a determination key 11, a lighting unit 12, a display switching key 13, a track pad 14, a brightness switching key 15, a direction key 16, a menu key 17, and a power switch 18. The determination key 11 detects a pressing operation and outputs a signal that determines the content operated in the controller 10. The lighting unit 12 notifies of the operation state of the HMD 100 according to the light emitting state thereof. For example, the power ON or OFF state or the like is the operation state of the HMD 100. For example, a LED is used as the lighting unit 12. The display switching key 13 detects the pressing operation, and for example, outputs a signal that switches display modes of the content moving picture to and from the 3D and 2D. The track pad 14 detects the operation of the user's finger on the operation surface of the track pad 14, and outputs a signal that corresponds to the detected content. Various types of a track pad such as an electrostatic type, pressure sensing type, or an optical type can be adopted as the track pad 14. The brightness switching key 15 detects the pressing operation and outputs a signal that increases or decreases the brightness of the image display unit 20. The direction key 16 detects the pressing operation on the key corresponding to the up, down, right, and left direction, and outputs a signal that corresponds to the detected content. The power switch 18 switches the power-on state of the HMD 100 by detecting a sliding operation of the switch.

Figure 2:
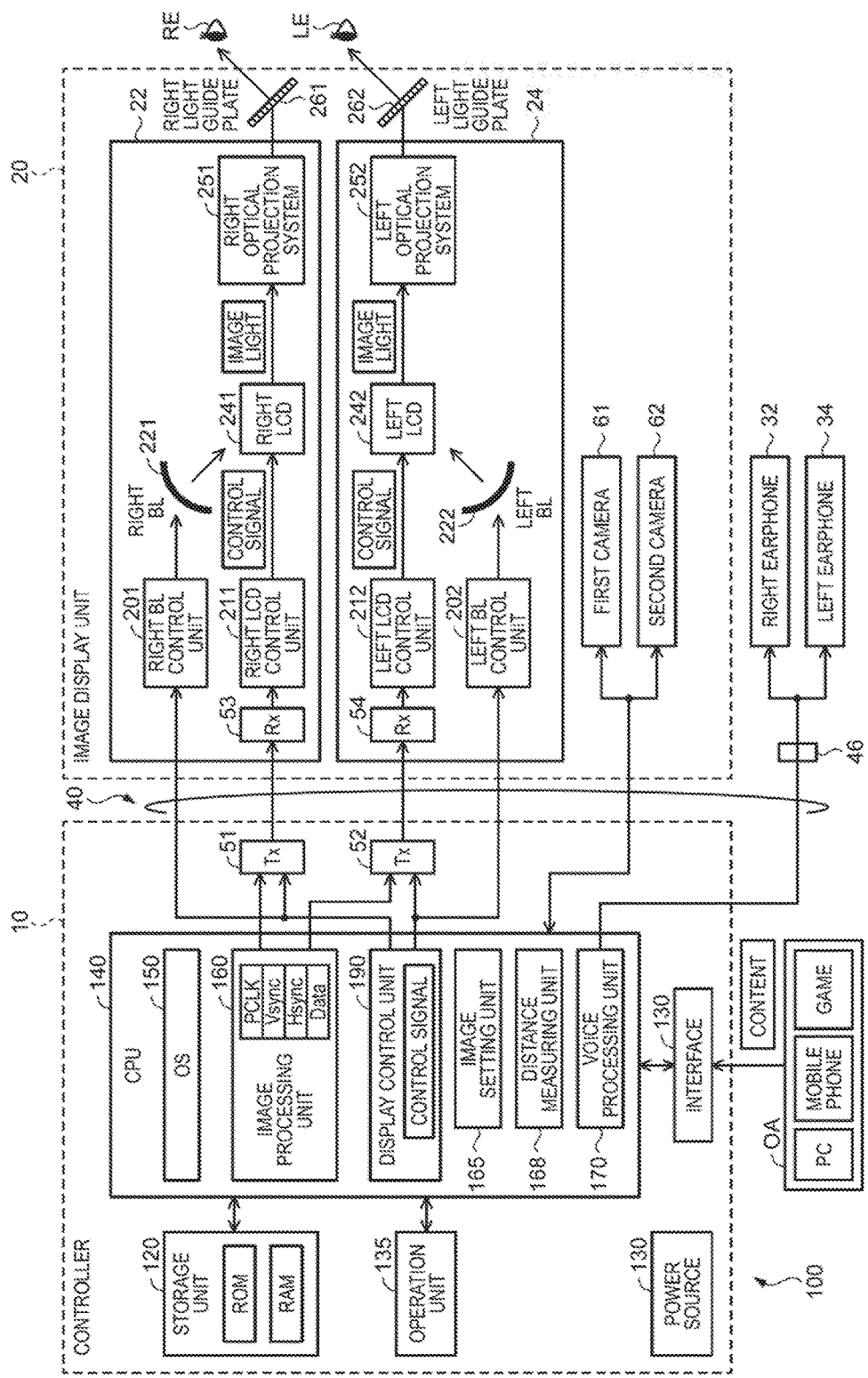
FIG. 2 is a block diagram functionally illustrating a configuration of the HMD in the first embodiment.

FIG. 2 is a block diagram functionally illustrating a configuration of the HMD 100 in the first embodiment. As illustrated in FIG. 2, the controller 10 includes a storage unit 120, a power source 130, an operation unit 135, a CPU 140, an interface 180, a transmission unit 51 (Tx 51), and a transmission unit 52 (Tx 52). The operation unit 135 receives the operation by the user and is configured to include the determination key 11, the display switching key 13, the track pad 14, the brightness switching key 15, the direction key 16, the menu key 17, and the power switch 18. The power source 130 supplies the power to each unit of the HMD 100. For example, a secondary battery can be used as the power source 130.

The storage unit 120 includes a ROM in which various computer programs are stored and a RAM which is used when the CPU 140 executes writing and reading of the various computer programs.

The CPU 140 functions as an operating system 150 (OS 150), a display control unit 190, a voice processing unit 170, an image processing unit 160, and an image setting unit 165 by reading the computer programs stored in the ROM and executing the writing/reading of the programs to/from the RAM of the storage unit 120.

The display control unit 190 generates a control signal that controls the right display drive unit 22 and the left display drive unit 24. Specifically, the display control unit 190 individually controls a drive ON/OFF of the right LCD 241 by a right LCD control unit 211, the drive ON/OFF of a right backlight 221 by a right backlight control unit 201, the drive ON/OFF of the left LCD 242 by a left LCD control unit 212, the drive ON/OFF of the left backlight 222 by a left backlight control unit 202 or the like, using the control signal. In this way, the display control unit 190 controls the generation and emission of the image light by each of the right display drive unit 22 and the left display drive unit 24. For example, the display control unit 190 causes both of the right display drive unit 22 and the left display drive unit 24 to generate the image light, causes only one of the display drive unit to generate the image light, or causes both of the display drive units not to generate the image light. "Generate the image light" is also referred to as "display the image".

The display control unit 190 transmits each control signal for the right LCD control unit 211 and the left LCD control unit 212 via the transmission unit 51 and the transmission unit 52, respectively. In addition, the display control unit 190 transmits each control signal for the right backlight control unit 201 and the left backlight control unit 202.

The image processing unit 160 acquires the image signal included in the content. The image processing unit 160 separates synchronization signals such as a vertical synchronization signal VSync and a horizontal synchronization signal HSync from the acquired image signal. In addition, the image processing unit 160 generates a clock signal PCLK according to the period of the separated vertical synchronization signal VSync and a horizontal synchronization signal HSync using a phase locked loop (PLL) circuit (not illustrated) or the like. The image processing unit 160 converts the analog image signal which is separated from the synchronization signal into a digital image signal using an A/D converter circuit (not illustrated) or the like. Then, the image processing unit 160 stores the conversion resulted digital signal in a DRAM in the storage unit 120 for each frame as image data (RGB data) of the target image. The image processing unit 160 may perform image processing tasks such as resolution conversion processing, various color correction processing such as brightness and saturation, and keystone correction processing on the image data, if necessary.

The image processing unit 160 transmits each of the generated clock signal PCLK, the vertical synchronization signal VSync, the horizontal synchronization signal HSync, and the image data stored in the DRAM in the storage unit 120 via the transmission units 51 and 52. The image data transmitted via the transmission unit 51 is referred to as "image data for right eye", and the image data transmitted via the transmission unit 52 is referred to as "image data for left eye". The transmission units 51 and 52 function as a transceiver for a serial transmission between the controller 10 and the image display unit 20.

The voice processing unit 170 acquires a voice signal included in the content, amplifies the acquired voice signal, and supplies the signal to a speaker (not illustrated) in the right earphone 32 and a speaker (not illustrated) in the left earphone 34 connected to the connection member 46. For example, in a case where Dolby® system is adopted, processing is performed on the voice signal and the different sounds of which, for example, the frequency or the like is changed are output from each of the right earphone 32 and the left earphone 34.

The image setting unit 165 performs various settings of the image (display image) to be displayed on the image display unit 20. For example, the image setting unit 165 sets a display position of the display image, a size of the display image, or brightness of the display image, and sets the image data for the right eye and the image data for the left eye such that a binocular parallax (simply referred to as "parallax") is formed for causing the display image to be stereoscopically (3D) and visually recognized as a three-dimensional image by the user. In the present embodiment, in a case where the three-dimensional image is visually recognized at the position separated by equal to or longer than a predetermined distance by the user, the image setting unit 165 causes the three-dimensional image in which the parallax is formed to be displayed on the image display unit 20. The details of the predetermined distance will be described below. The image setting unit 165 corresponds to a display image setting unit in the aspects of the invention.

Figure 3:
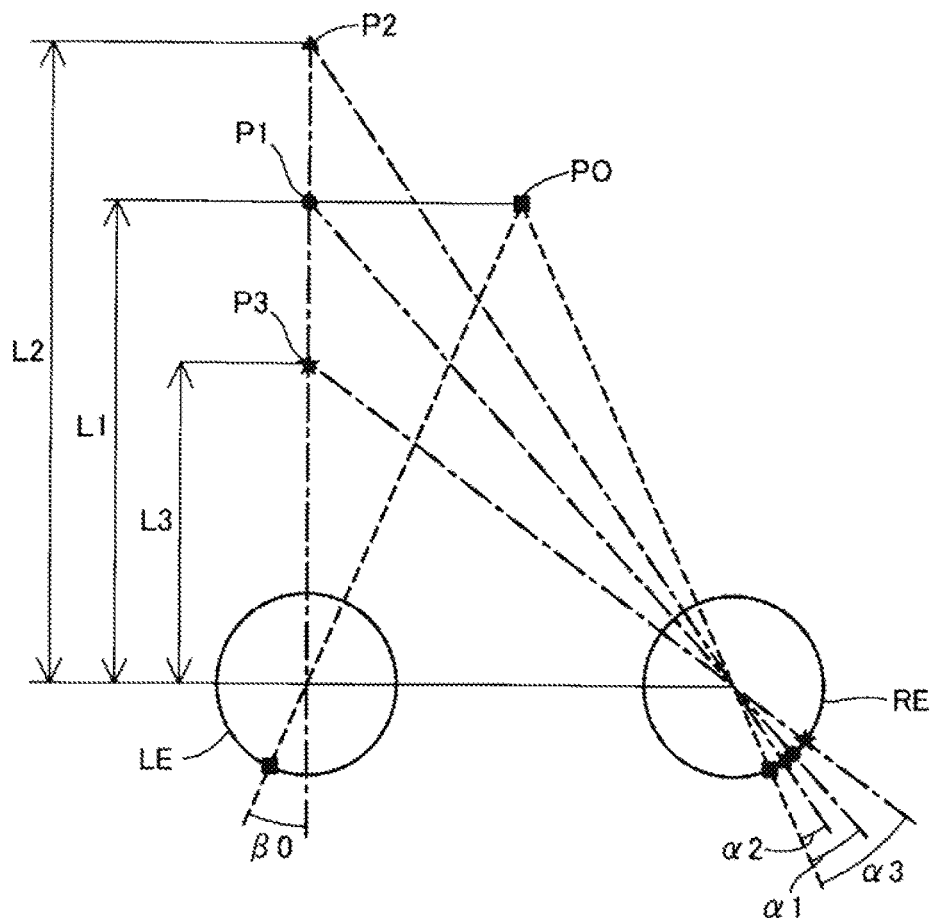
FIG. 3 is an explanatory diagram illustrating a binocular parallax.

FIG. 3 is an explanatory diagram illustrating the binocular parallax. In FIG. 3, angles $\alpha 1$, $\alpha 2$, $\alpha 3$, and $\beta 0$ relating to the binocular parallax in a case where the user gazes at any one of a first point P1, a second point P2, and a third point P3 from a state in which the right eye RE and left eye LE gaze at an initial point P0 are illustrated. The binocular parallax means an amount of change in which an amount of change of the fovea centralis of the right eye RE and an amount of change of the fovea centralis of the left eye LE are added in a case where the gazing point is changed. The fovea centralis is a place where eyesight is the highest in the retina.

For example, as illustrated in FIG. 3, when the gazing point is changed to the first point P1 from the initial point P0 which is away from both eyes of the user by a distance L1, the amount of change of the fovea centralis of the right eye RE is the angle $\alpha 1$ and the amount of change of the fovea centralis of the left eye LE is the angle $\beta 0$. The absolute values of the angle $\alpha 1$ and the angle $\beta 0$ are the same, and changing directions of the right eye RE and the left eye LE are a clockwise direction with reference to the center of each eye. Therefore, the binocular parallax of the angle $\alpha 1$ and the angle $\beta 0$ is zero. Therefore, even if the gazing point of the user is changed from the initial point P0 to the first point P1, the user recognizes that the first point P1 exists at the position away from the user by the distance L1 which is the same distance L1 to the initial point P0.

When the gazing point of the user is changed from the initial point P0 to the second point P2, the amount of change of the fovea centralis of the right eye RE is the angle $\alpha 2$ and the amount of change of the fovea centralis of the left eye LE is the angle $\beta 0$. Therefore, the binocular parallax is a clockwise angle ($\beta 0 - \alpha 2$) with reference to the center of each eye. The user recognizes that the second point P2 exists at the position away from the user by the distance L2 based on this binocular parallax. When the gazing point of the user is changed from the initial point P0 to the third point P3, the amount of change of the fovea centralis of the right eye RE is the angle $\alpha 3$ and the amount of change of the fovea centralis of the left eye LE is the angle $\beta 0$. Therefore, the binocular parallax is a counter-clockwise angle ($\alpha 3 - \beta 0$) with reference to the center of each eye. The user recognizes that the third point P3 exists at the position away from the user by the distance L3 based on this binocular parallax.

The interface 180 illustrated in FIG. 2 is an interface for connecting various external devices OA which are the supply sources of the content to the controller 10. As the external devices OA, a personal computer (PC), a mobile phone terminal, a game terminal, or the like can be exemplified. As the interface 180, for example, a USB interface, a micro USB interface, an interface for a memory card, or the like can be used.

The image display unit 20 includes the right display drive unit 22, the left display drive unit 24, the right light guide plate 261 as the right optical image display unit 26, the left light guide plate 262 as the left optical image display unit 28, the first camera 61, and the second camera 62.

The right display drive unit 22 includes a reception unit 53 (Rx 53), the right backlight control unit 201 (right BL control unit 201) and the right backlight 221 (right BL 221) that function as light sources, and the right LCD control unit 211 and the right LCD 241 that function as display elements, and the right projection optical system 251. The right backlight control unit 201 and the right backlight 221 function as light sources. The right LCD control unit 211 and the right LCD 241 function as display devices. The right backlight control unit 201, the right LCD control unit 211, the right backlight 221, and the right LCD 241 are collectively referred to as an "image light generation unit".

The reception unit 53 functions as a receiver for the serial transmission between the controller 10 and the image display unit 20. The right backlight control unit 201 drives the right backlight 221 based on the input control signal. The right backlight 221 is, for example, a light emitting device such as the LED or an electroluminescence (EL). The right LCD control unit 211 drives the right LCD 241 based on the clock signal PCLK input via the reception unit 53, the vertical synchronization signal VSync, the horizontal synchronization signal HSync, and image data for the right eye. The right LCD 241 is a transmission type liquid crystal panel on which a plurality of pixels is arrayed in a matrix shape.

The right projection optical system 251 is configured to include a collimator lens that makes the image light emitted from the right LCD 241 become a light flux of parallel state. The right light guide plate 261 as the right optical image display unit 26 guides the image light emitted from the right projection optical system 251 to the right eye RE of the user while being reflected along a predetermined optical path. The right projection optical system 251 and the right light guide plate 261 are collectively referred to as a "light guide unit".

The left display drive unit 24 has a configuration similar to that of the right display drive unit 22. The left display drive unit 24 includes a reception unit 54 (Rx 54), the left backlight control unit 202 (left BL control unit 202) and the left backlight 222 (left BL 222) that function as light sources, the left LCD control unit 212 and the left LCD 242 that function as display elements, and a left projection optical system 252. The left backlight control unit 202 and the left backlight 222 function as light sources. The left LCD control unit 212 and the left LCD 242 function as display elements. The left backlight control unit 202, the left LCD control unit 212, the left backlight 222, and the left LCD 242 are collectively referred to as an "image light generation unit". In addition, the left projection optical system 252 is configured to include the collimator lens that makes the image light emitted from the left LCD 242 become a light flux of parallel state. The left light guide plate 262 as the left optical image display unit 28 guides the image light emitted from the left projection optical system 252 to the left eye LE of the user while being reflected along the predetermined optical path. The left projection optical system 252 and the left light guide plate 262 are collectively referred to as a "light guide unit".

Figure 4:
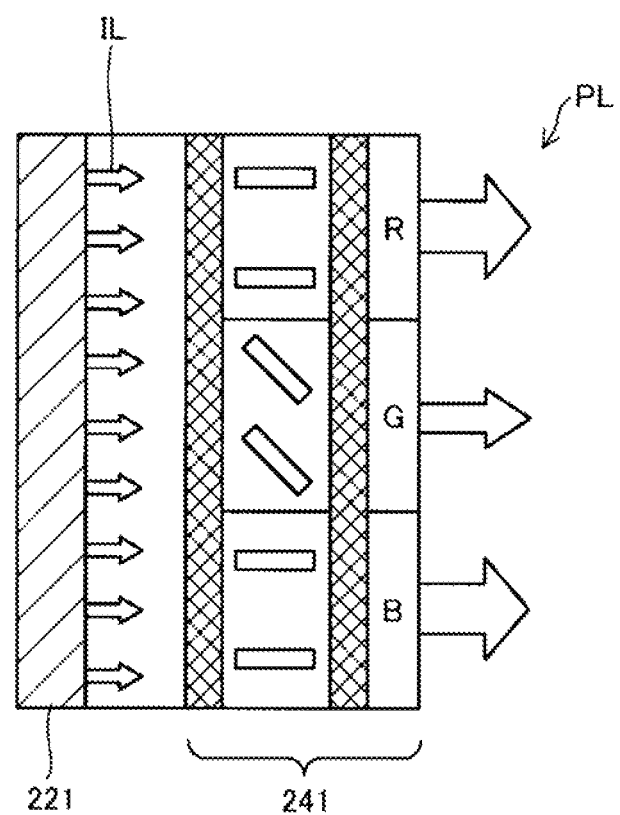
FIG. 4 is an explanatory diagram illustrating a state in which an image light is emitted by an image light generation unit.

FIG. 4 is an explanatory diagram illustrating a state in which an image light is emitted by the image light generation unit. The right LCD 241 changes the transmittance of the light transmitting the right LCD 241 by driving the liquid crystal at each pixel position arrayed in the matrix shape. As a result, the illumination light IL emitted from the right backlight 221 is modulated to an effective image light PL representing the image. The state in the left side is similar to that in the right side. As illustrated in FIG. 4, the backlight type is adopted in the present embodiment. However, the image light may be emitted using a configuration of front light type or a reflection type.

A-2. Relationship Between an Effective Field of View of the User and an Imaging Range of the Cameras 61 and 62

A man can visually recognize a subject existing within a certain range of a field of view with a viewpoint as a center.

Generally, in a case where the distances from the viewpoint to the subject are the same, the man can visually recognize the subject existing in the field of view nearer to the viewpoint more clearly. A region of equal to or less than 5° with the viewpoint as a center is referred to as a discrimination field of view in which a visual function such as eyesight is excellent. In addition, a region of equal to or less than 30° horizontally with the viewpoint as a center and equal to or less than 20° vertically with the viewpoint as a center is referred to as an effective field of view in which the user can instantaneously recognize by a simple eyeball movement. In addition, a region of 60° to 90° horizontally with the viewpoint as a center and 45° to 70° vertically with the viewpoint as a center is referred to as a stable fixation field in which the user can visually recognize the subject without difficulty by eyeball movement or head movement.

Figure 5:
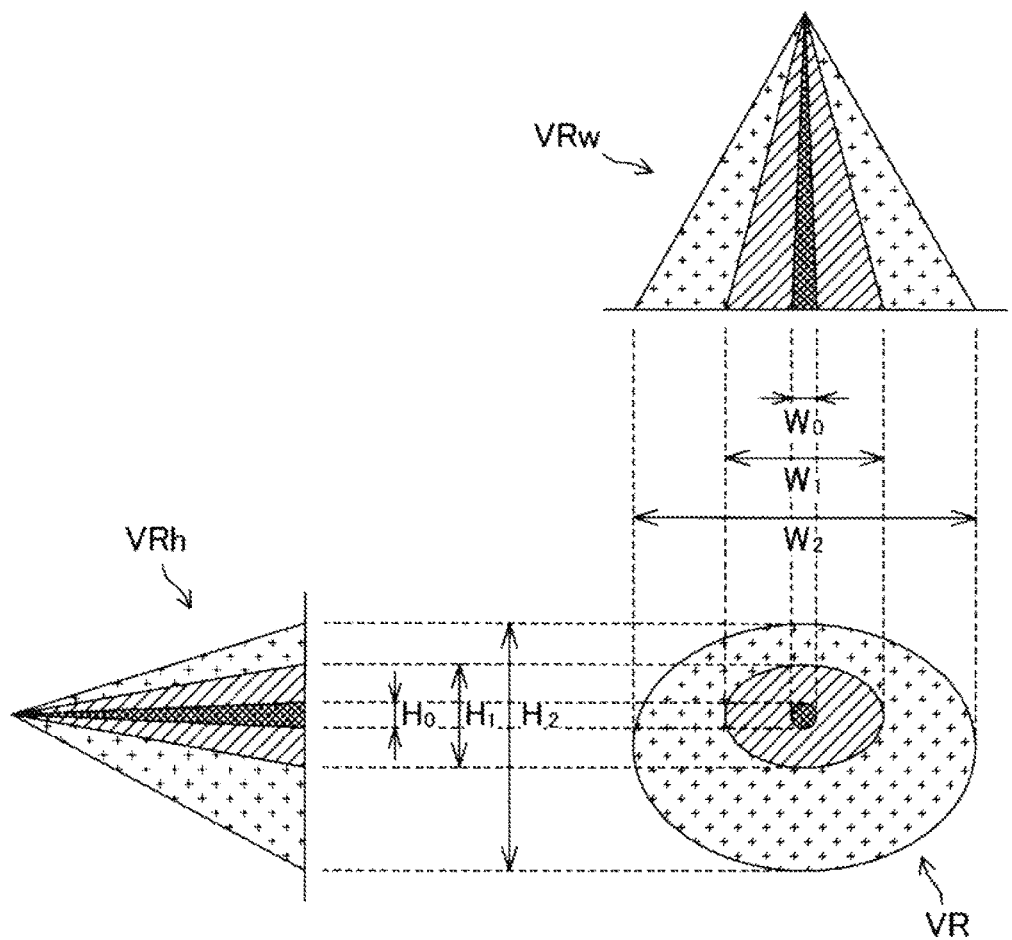
FIG. 5 is a schematic diagram of a horizontal field of view and a vertical field of view with a viewpoint as a center.

FIG. 5 is a schematic diagram of a horizontal field of view VRw and a vertical field of view VRh with a viewpoint as a center. In FIG. 5, a relationship between the discrimination field of view, the effective field of view, and the stable fixation field in the horizontal direction and the vertical direction is illustrated. In FIG. 5, in a case where the user is looking at a specific point, the field of view VR in which the user can visually recognize with the viewpoint as the center, the horizontal field of view VRw which is a horizontal component of the field of view VR divided for the explanation, and the vertical field of view VRh which is a vertical component of the field of view VR divided for the explanation are illustrated. In FIG. 5, the discrimination field of view, the effective field of view, and the stable fixation field are expressed as relationship (1) described below. The angles written in parentheses in relationship (1) are angles of one side with the viewpoint as the center.

discrimination field of view: W0,H0 (approximately 5°) effective field of view: W1 (approximately 30°), H1 (approximately 20°)

stable fixation field: W2 (approximately 60° (90°)), H2 (approximately 45° (70°))  (1)

As illustrated in FIG. 5, in the vertical direction of the field of view VR, the range of the stable fixation field or the like is wider in the upper side than that in the lower side. This means that the man visually recognizes the lower side easier than recognizing the upper side along the vertical direction.

Figure 6:
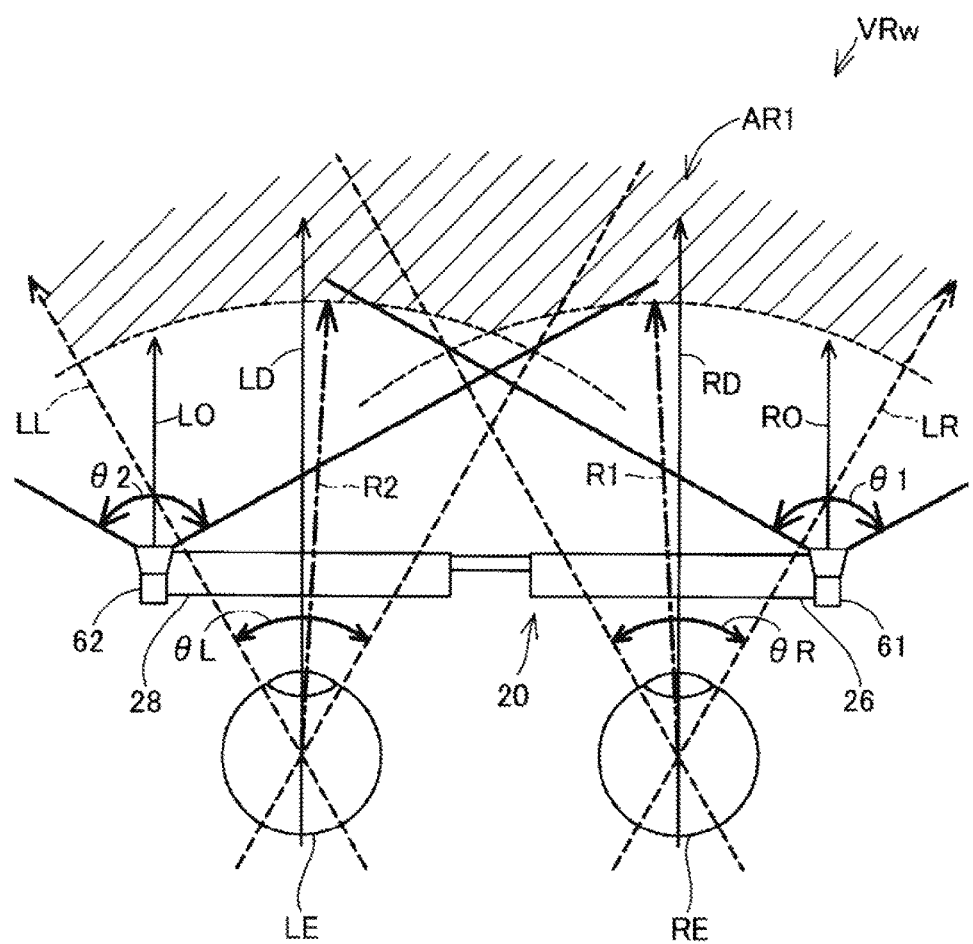
FIG. 6 is an explanatory diagram illustrating a relationship between an imaging range of a camera in the horizontal direction and the horizontal field of view of a user in the first embodiment.

FIG. 6 is an explanatory diagram illustrating a relationship between an imaging range of the cameras 61 and 62 in the horizontal direction and the horizontal field of view VRw of a user in the first embodiment. In FIG. 6, a simplified diagram is illustrated in a case where the user who wears the image display unit 20 on his/her head is seen from the upper side in the vertical direction. In FIG. 6, only the right eye RE and the left eye LE of the user are illustrated and other parts (for example, a nose or the like) of the head are not illustrated. In addition, in the image display unit 20, only the optical image display units 26 and 28 and the cameras 61 and 62 are illustrated and other configurations are not illustrated. In FIG. 6, since the user is facing the front, a line-of-sight direction RD of the right eye RE and a line-of-sight direction LD of the left eye LE are perpendicular to the optical image display units 26 and 28. The right eye RE visually recognizes the range of a field of view angle θR with the line-of-sight direction RD of the right eye RE as the center. Similarly, the left eye LE visually recognizes the range of a field of view angle θL with the line-of-sight direction LD of the right eye LE as the center. In the present embodiment, the field of view angle 8R and the field of view angle θL are illustrated as the stable fixation field illustrated in FIG. 5. The first camera 61 images the range of angle of view θ1 with an optical axis RO of the first camera 61 as the center. Similarly, the second camera 62 images the range of angle of view θ2 with an optical axis LO of the second camera 62 as the center.

When visually recognizing a certain subject, there exists a distance where a man can visually recognize the subject clearly and a distance where the man visually recognizes the subject as blurry (to be out of focus) according to the distance from the subject. The distance where the man can visually recognize the subject clearly is called a lower limit of depth of field (hereinafter, simply referred to as a "lowest depth of field"). The depth of field (DOF) means a range of the distance in which the subject is in focus and the subject can be visually recognized clearly. Strictly speaking, a place focused on by the man is one plane separated from the user by a predetermined distance. However, the man can visually recognize the plane in front and back of the plane clearly by allowing a constant distance as an allowance.

Figure 7:
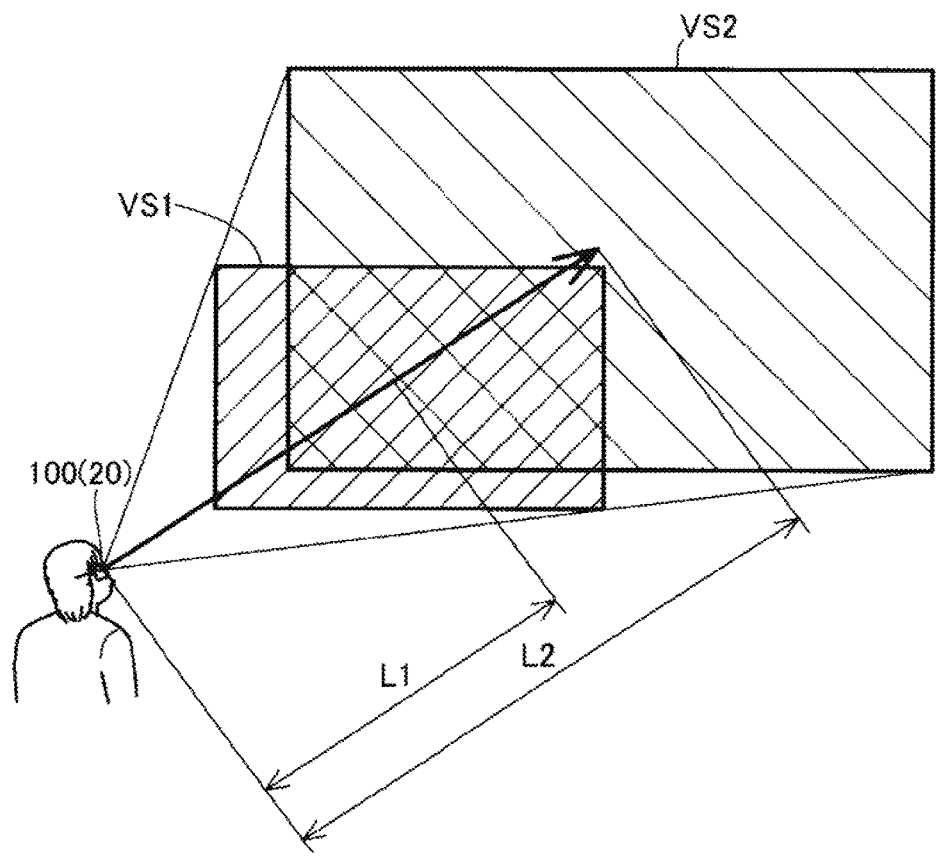
FIG. 7 is an explanatory diagram illustrating a relationship between a region where a user visually recognizes the image displayed on an image display unit and a depth of field.

FIG. 7 is an explanatory diagram illustrating a relationship between the region where the user visually recognizes the image displayed on an image display unit 20 and the depth of field. In FIG. 7, in a case where the user who wears the image display unit 20 of the HMD 100 on his/her head visually recognizes the display image, a state in which the size of the display image visually recognized by the user differs according to the distance from the gazing point of the user is illustrated. As illustrated in FIG. 7, in a case where the gazing point of the user is separated from the user by the distance L1, the user visually recognizes the image displayed on the image display unit 20 in a size of the viewing region VS1. Similarly, in a case where the gazing point of the user is separated from the user by the distance L2, the user visually recognizes the image displayed on the image display unit 20 in a size of the viewing region VS2. Even if the sizes of the display images are the same, if the position of the user and the position of the gazing point of the user are different from each other, the depths of field become different from each other. Therefore, the sizes of the display images visually recognized by the user become different from each other. As the distance to the gazing point of the man becomes longer, the focused range for the man (range that can be visually recognized clearly) becomes larger. This state is referred to as the depth of field is deep.

In a case where the image setting unit 165 causes the image display unit 20 to display the image, when the distance to the image display position from the right eye RE and the left eye LE of the user is too short, that is, when the distance to the subject from the user is shorter than the lowest depth of field, the user cannot visually recognize the displayed image clearly but visually recognizes the image in a blurred state. For this reason, in order to cause the user to visually recognize the image clearly, as the distance to the image display position from the right eye RE and left eye LE of the user, it is preferable to separate the distance equal to or longer than the distance R1 as the distance of the lowest depth of field from the right eye RE and separate the distance equal to or longer than the distance R2 as the distance of the lowest depth of field from the left eye LE. Therefore, for example, in order for the image setting unit 165 to cause the user to visually recognize such an image as to be superimposed on the imaged subject clearly, it is necessary for the cameras 61 and 62 be separated from the right eye RE by the distance equal to or longer than the distance R1 and it is necessary to capture the image of the range separated from the left eye LE by the distance equal to or longer than the distance R2. That is, in the present embodiment, since the positions of the right eye RE and the left eye LE set with respect to the image display unit 20 have been determined, it is necessary for the cameras 61 and 62 to capture the images of the range separated from the image display unit 20 by the predetermined distance. In other words, in the present embodiment, the cameras 61 and 62 may not necessarily capture the images of the range separated from the image display unit 20 by less than the predetermined distance. It can be said that whether the image is visually recognized by the user clearly or not according to the distance is not limited to the image displayed on the image display unit 20, but is the same for the subject existing in the outside scene. The distance R1 and the distance R2 correspond to a set distance in the aspects of the invention.

In addition, the horizontal field of view VRw in which the user visually recognizes the image is the range in which the range of the field of view angle θR with the right eye RE as the center and the range of the field of view angle θL with the left eye LE as the center are combined. For this reason, in the present embodiment, in order for the image setting unit 165 to cause the user to visually recognize such an image as to be superimposed on the imaged subject clearly, the cameras 61 and 62 need to capture the images in the range including the field of view VR. In other words, in the present embodiment, the cameras 61 and 62 may not necessarily capture the images in the range which is not included in the field of view VR. Hereinafter, the description will be made only regarding the horizontal direction in accordance with the horizontal field of view VRw in FIG. 6, and the same description can be made regarding the vertical direction. Therefore, the description regarding the vertical direction will be omitted. In order to capture the images in the range including the horizontal field of view VRw, the cameras 61 and 62 need to capture the images in the range formed by a field of view right end LR at the furthest right side in the field of view angle θR of the right eye RE and a field of view left end LL at the furthest left side in the field of view angle θL of the left eye LE. That is, in order for the image which is superimposed on the subject included in the outside scene visually recognized by the user clearly to be displayed on the image display unit 20, the imaging ranges of the cameras 61 and 62 need to include an essential range AR1 that satisfies the following two conditions. The two conditions are a clarity condition (1) as a condition for causing the user to visually recognize the subject clearly and a field of view condition (2) as a condition for including the field of view of the user.

(1) At least one of the cameras 61 and 62 capture the images in the range separated from the right eye RE by equal to or longer than the distance R1 and separated from the left eye LE by equal to or longer than the distance R2.

(2) At least one of the cameras 61 and 62 captures the images in the range including the stable fixation field.

As described above, as illustrated in FIG. 6, in the HMD 100 in the present embodiment, the range in which the imaging range of the first camera 61 and the imaging range of the second camera 62 are combined is set so as to include the essential range AR1. That is, the imaging range of the cameras 61 and 62 is set based on the range separated from the image display unit 20 by the predetermined distance and the set range of the field of view of the user. Therefore, in the HMD 100 in the present embodiment, in a case where the image which is in association with the position of the subject included in the imaged outside scene is displayed on the image display unit 20, in the range in which the user can visually recognize the outside scene clearly, the image which can be visually recognized clearly by the user is displayed on the image display unit 20. In addition, by limiting the range of the field of view that the user needs, the cameras 61 and 62 do not need to capture the image of the unnecessary range of the outside scene, and thus, it is possible to provide the HMD 100 including the cameras 61 and 62 that meet the needs of the user.

In addition, in the HMD 100 in the present embodiment, the set field of view angle θR with the right eye RE of the user as the center and the set field of view angle θL with the left eye LE of the user as the center are set as the set range of the field of view of the user. Therefore, in the HMD 100 in the present embodiment, since the field of view angles are set while the right eye RE and the left eye LE are distinguished, the image in which the distance is also taken into consideration can be visually recognized by the user like a three-dimensional image to be stereoscopically recognized by the user by forming a parallax. Therefore, the usability of the user is improved compared to the case of a single eye.

In addition, in the HMD 100 in the present embodiment, in a case where the position where the display image displayed on the image display unit 20 is visually recognized by the user is separated by the distance equal to or longer than the predetermined distance, the image setting unit 165 causes the display image to be displayed on the image display unit 20 as the three-dimensional image. Therefore, in the HMD 100 in the present embodiment, the user does not visually recognize a blurred three-dimensional image. Thus, the usability of the user is improved.

In addition, in the HMD 100 in the present embodiment, the first camera 61 and the second camera 62 are included as the two imaging units, and the range of the optical axis RO and the angle of view θ1 in the first camera 61 and the range of the optical axis LO and the angle of view θ2 in the second camera 62 are set such that the imaging range of the first camera 61 and the imaging range of the second camera 62 include the essential range AR1. For this reason, in the HMD 100 in the present embodiment, by setting any of the angle of view and the optical axis of the cameras 61 and 62, it is possible to cause the clear image to be visually recognized by the user. Therefore, the degree of freedom for arranging the cameras 61 and 62 is improved and it becomes easy to manufacture the image display unit 20 on which the cameras 61 and 62 are mounted.

In addition, in the HMD 100 in the present embodiment, the angles of view of the first camera 61 and the second camera 62 which are the two imaging units can include the stable fixation field of the user and the region other than the stable fixation field can be included. In addition, since the optical axis RO of the first camera 61 and the optical axis LO of the second camera 62 are perpendicular to the optical image display units 26 and 28, the deviation between the captured image and the display image becomes small, and thus, the image with less discomfort with respect to the outside scene is displayed on the image display unit 20. In addition, since the two cameras 61 and 62 are used, the distance to the imaged subject can be measured based on each of the images captured by the cameras 61 and 62. In addition, since the optical axis RO of the first camera 61 and the optical axis LO of the second camera 62 are parallel to each other, it is possible to easily measure the distance to the imaged subject.

B. Second Embodiment

Figure 8:
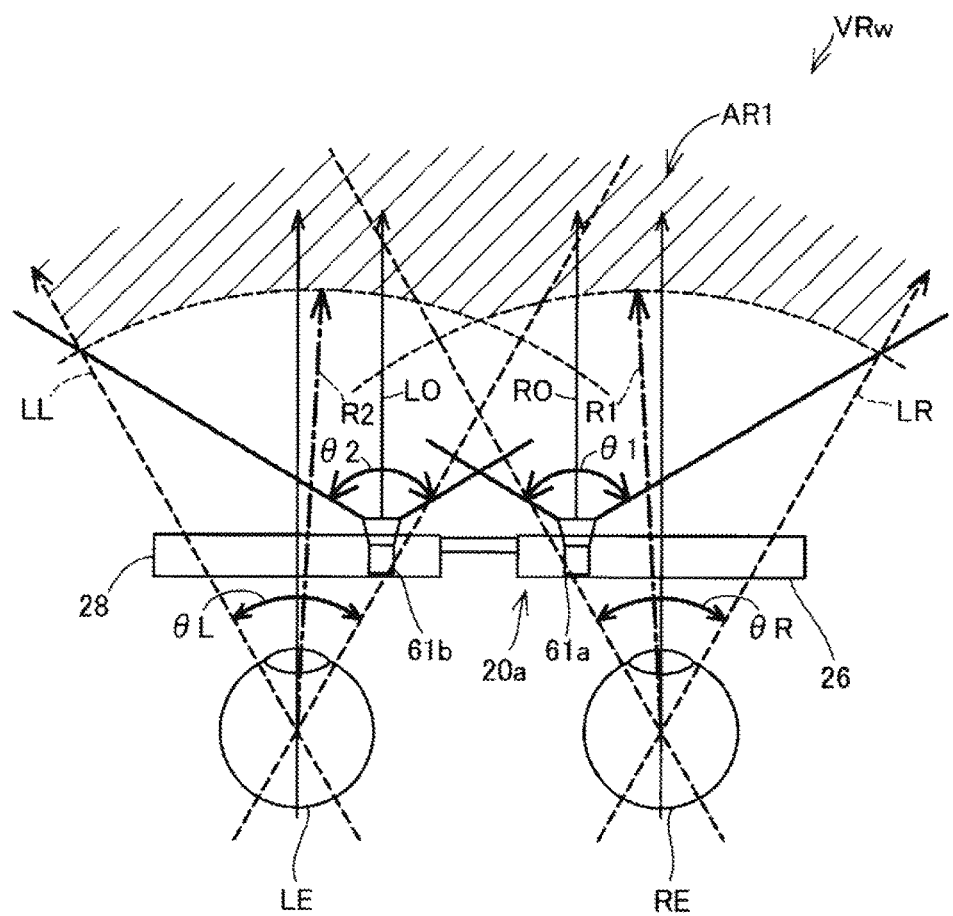
FIG. 8 is an explanatory diagram illustrating a relationship between the imaging range of a camera in the horizontal direction and the horizontal field of view of the user in a second embodiment.

FIG. 8 is an explanatory diagram illustrating a relationship between the imaging ranges of a camera 61a and a camera 62a in the horizontal direction and the horizontal field of view VRw in a second embodiment. In the second embodiment, the position on an image display unit 20a where the cameras 61a and 62a are disposed is different from that of the cameras 61 and 62 in the first embodiment and other configurations are the same as that in the first embodiment. In FIG. 8, similar to the first embodiment in FIG. 6, only the right eye RE and the left eye LE of the user, the optical image display units 26 and 28, and the cameras 61a and 62a are illustrated, and the illustrations of other parts of the user's body or other configurations of the image display unit 20a are omitted. This omission of illustration is similarly applicable to each of FIG. 9 to FIG. 13 below. As illustrated in FIG. 8, the first camera 61a in the second embodiment is disposed in the direction near the left optical image display unit 28 compared to the first camera 61 in the first embodiment. Similarly, the second camera 62a in the second embodiment is disposed in the direction near the right optical image display unit 26 along the direction to the right optical image display unit 26 from the left optical image display unit 28 compared to the second camera 62 in the first embodiment. In other words, the second camera 62a in the second embodiment is disposed at the position near a nose of the user compared to the camera 61 in the first embodiment. The imaging ranges of the cameras 61a and 62a in the second embodiment are set so as to include the essential range AR1 that satisfies both the clarity condition (1) and the field of view condition (2) described in the first embodiment. Therefore, in the HMD 100a in the second embodiment, as is similar to HMD 100 in the first embodiment, in a case where the image which is in association with the position of the subject included in the captured image of the outside scene is displayed on the image display unit 20a, the image which can be visually recognized by the user clearly is displayed on the image display unit 20a in the range in which the user can visually recognize the outside scene clearly.

In addition, in the HMD 100a in the second embodiment, the stable fixation field of the user can be included in the angle of view of each of the cameras 61a and 62a, and the region other than the stable fixation field can also be included. In addition, since the two cameras 61a and 62a are used, the distance to the imaged subject can be measured based on each of the images captured by the cameras 61a and 62a. In addition, since the optical axis RO of the first camera 61a and the optical axis LO of the second camera 62a are parallel to each other, the distance to the imaged subject can easily be measured. In addition, since the optical axes of each of the cameras 61a and 62a in the second embodiment intersect each other, the overlapping ranges of each of the cameras 61a and 62a become large compared to that in the first embodiment. Therefore, the distance to the more imaged subjects can be measured. In addition, since the optical axes of each of the cameras 61a and 62a in the second embodiment intersect each other, even if the angle of views of the cameras 61a and 62a are small compared to the cameras 61 and 62 in the first embodiment, the stable fixation field of the user can be included in the imaging ranges of the cameras 61a and 62a.

C. Third Embodiment

Figure 9:
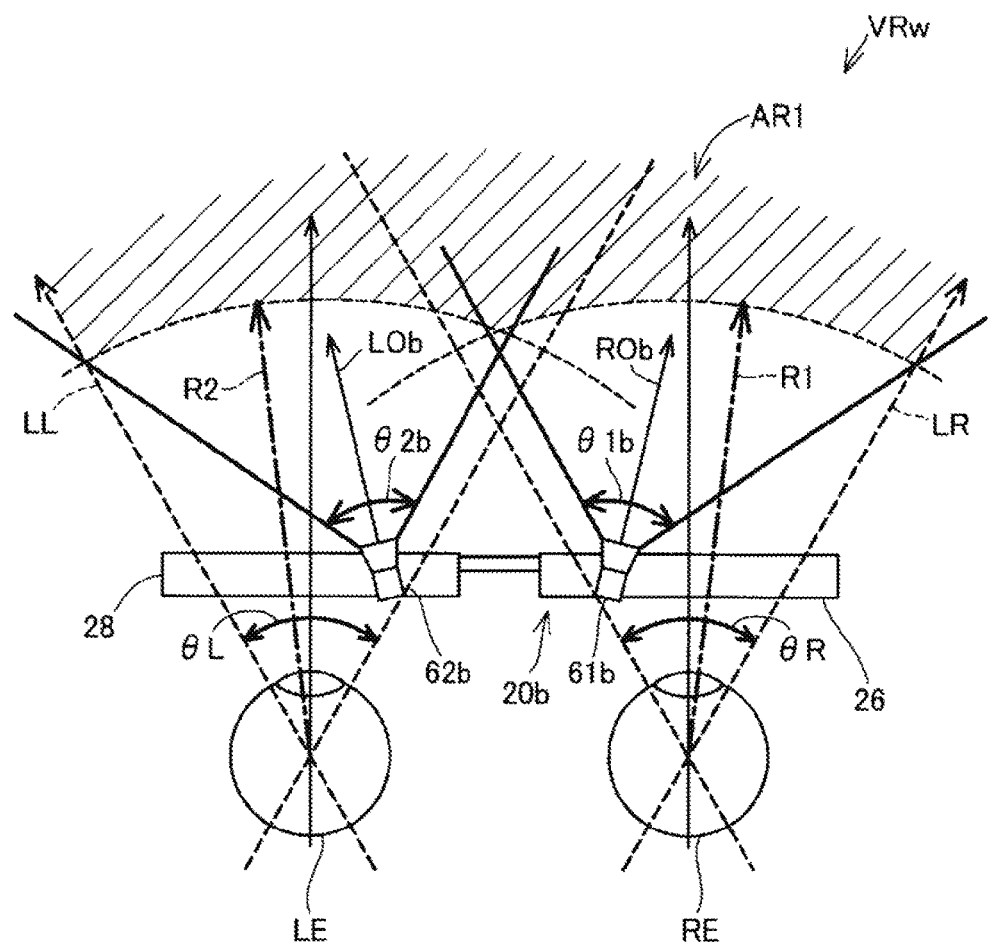
FIG. 9 is an explanatory diagram illustrating a relationship between an imaging range of a camera in the horizontal direction and the horizontal field of view of the user in a third embodiment.

FIG. 9 is an explanatory diagram illustrating a relationship between the imaging ranges of a camera 61b and a camera 62b in the horizontal direction and the horizontal field of view VRw in a third embodiment. In the third embodiment, the position on an image display unit 20b and the direction where the cameras 61b and 62b are disposed are different from that of the cameras 61 and 62 in the first embodiment, and other configurations are the same as that in the first embodiment. In FIG. 9, similar to the first embodiment in FIG. 6, only the right eye RE and the left eye LE, the optical image display units 26 and 28, and the cameras 61b and 62b are illustrated. As illustrated in FIG. 9, in the first camera 61b in the third embodiment, the direction of an optical axis ROb and angle of view θ1b is different from that in the first camera 61a in the second embodiment, and the position on the image display unit 20b where the first camera 61b is disposed is the same as that of the first camera 61a in the second embodiment. Similarly, in the second camera 62b in the third embodiment, the direction of an optical axis LOb and angle of view θ2b is different from that in the second camera 62a in the second embodiment, and the position on the image display unit 20b where the second camera 62b is disposed is the same as that of the second camera 62a in the second embodiment. The optical axis ROb of the first camera 61b is facing the right side (outward) than the optical axis RO of the first camera 61a in the second embodiment. The angle of view θ1b of the first camera 61b is smaller than the angle of view θ1 of the first camera 61a in the second embodiment. In addition, the angle of view θ2b of the second camera 62b is smaller than the angle of view θ2 of the second camera 62a in the second embodiment. The imaging range of the cameras 61b and 62b in the third embodiment are set so as to include the essential range AR1 that satisfies both the clarity condition (1) and the field of view condition (2) described in the first embodiment. Therefore, in the HMD 100b in the third embodiment, as is similar to HMD 100 in the first embodiment, in a case where the image which is in association with the position of the subject included in the captured image of the outside scene is displayed on the image display unit 20b, the image which can be visually recognized by the user clearly is displayed on the image display unit 20b in the range in which the user can visually recognize the outside scene clearly.

In addition, in the HMD 100b in the third embodiment, the stable fixation field of the user can be included in the angle of view of each of the first cameras 61b and the second camera 62b which are two imaging units, and the region other than the stable fixation field can also be included. Particularly, since the optical axis ROb of the first camera 61b and the optical axis LOb of the second camera 62b are set to be separated from each other as the axes move away from the image display unit 20b, the cameras 61b and 62b can capture the images in a wider range. In addition, since the two cameras 61b and 62b are used, the distance to the imaged subject can be measured based on each of the images captured by the cameras 61b and 62b.

D. Fourth Embodiment

Figure 10:
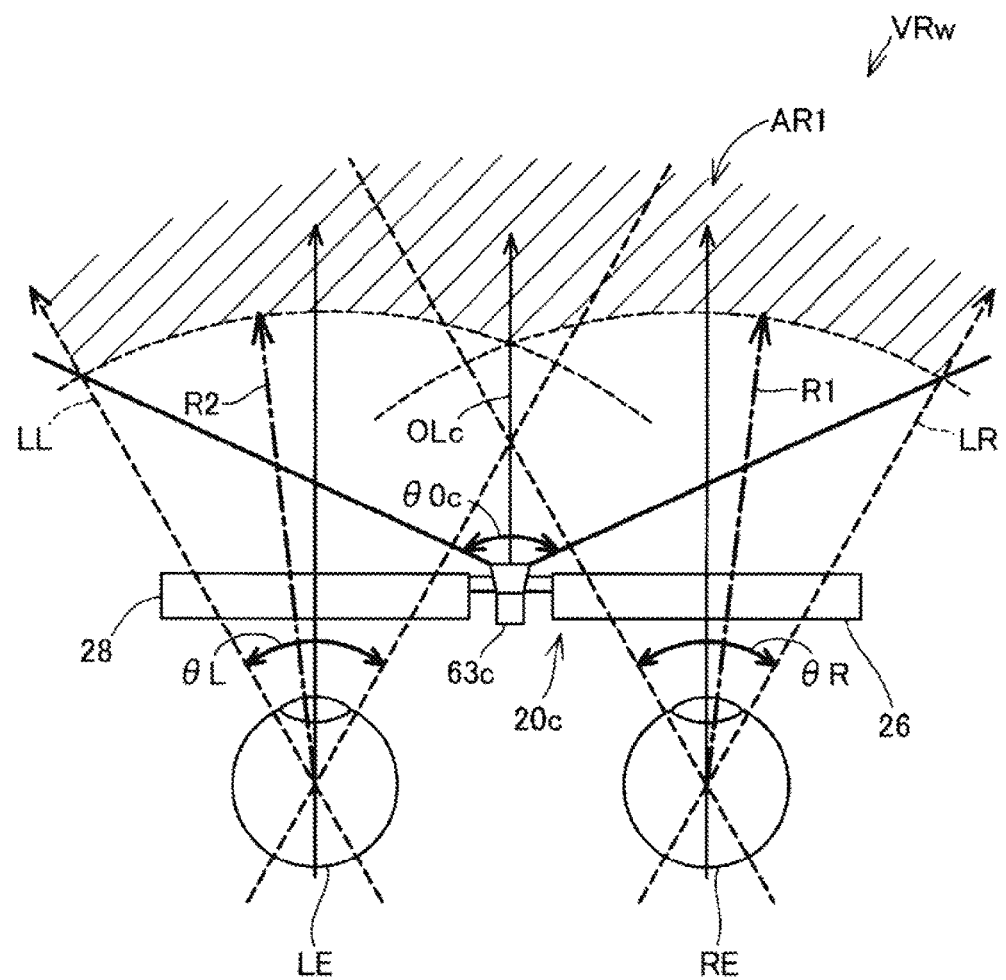
FIG. 10 is an explanatory diagram illustrating a relationship between the imaging range of a camera in the horizontal direction and the horizontal field of view of the user in a fourth embodiment.

FIG. 10 is an explanatory diagram illustrating a relationship between the imaging range of a camera 63c in the horizontal direction and the horizontal field of view VRw of the user in a fourth embodiment. As illustrated in FIG. 10, in the fourth embodiment, the point different from that in the first embodiment to the third embodiment is the fact that one camera 63c is disposed in the image display unit 20c as the imaging unit that captures the image of outside scene, and other configurations are the same as that in the first embodiment to the third embodiment. The camera 63c in the fourth embodiment is disposed between the right optical image display unit 26 and the left optical image display unit 28. An optical axis OLc of the camera 63c in the fourth embodiment is perpendicular to the optical image display units 26 and 28. An angle of view θOc of the camera 63c in the fourth embodiment is greater than the angles of view θ1 and θ2 of the cameras 61 and 62 in the first embodiment. The imaging range of the camera 63c in the fourth embodiment are set so as to include the essential range AR1 that satisfies both the clarity condition (1) and the field of view condition (2) described in the first embodiment. Therefore, in the HMD 100c in the fourth embodiment, as is similar to the HMD 100 in the first embodiment, in a case where the image which is in association with the position of the subject included in the captured image of the outside scene is displayed on the image display unit 20c, the image which can be visually recognized by the user clearly is displayed on the image display unit 20c in the range in which the user can visually recognize the outside scene clearly.

In addition, in the HMD 100c in the fourth embodiment, the stable fixation field of the user can be included in the angle of view of the cameras 63c as one imaging unit, and the region other than the stable fixation field can also be included. In addition, since the optical axis OLc of the camera 63c is perpendicular to the optical image display units 26 and 28, the deviation between the captured image and the display image becomes small, and thus, the image with less discomfort with respect to the outside scene is displayed on the image display unit 20c.

E. Fifth Embodiment

Figure 11:
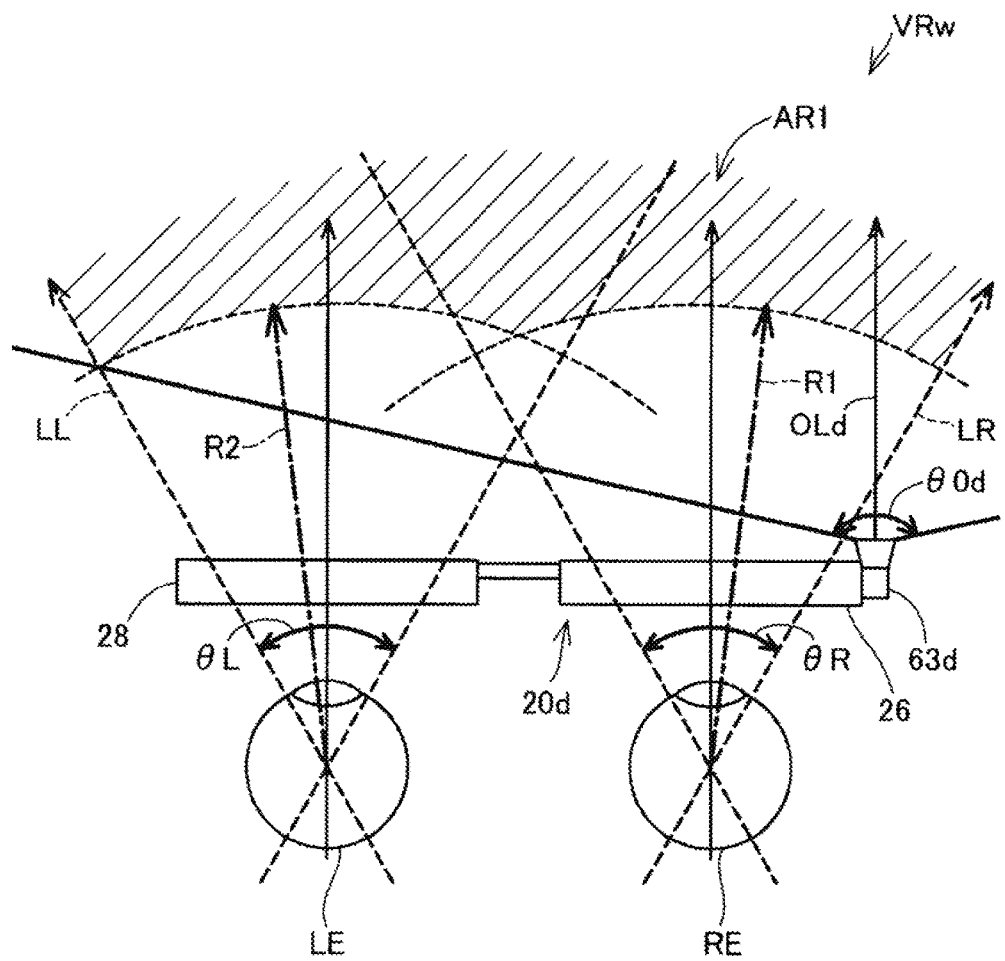
FIG. 11 is an explanatory diagram illustrating a relationship between the imaging range of a camera in the horizontal direction and the horizontal field of view in a fifth embodiment.

FIG. 11 is an explanatory diagram illustrating a relationship between the imaging range of a camera 63d in the horizontal direction and the horizontal field of view VRw of the user in a fifth embodiment. As illustrated in FIG. 11, in the fifth embodiment, the position on an image display unit 20d where the camera 63d is disposed and an angle of view θOd of the camera 63d are different from that of the fourth embodiment, and other configurations are the same as that in the fourth embodiment. In the fifth embodiment, the camera 63d is disposed at the right end of the right optical image display unit 26, that is, at the position of an end portion ER in the image display unit 20d. The size of the angle of view θOd of the camera 63d in the fifth embodiment is greater than the angle of view θOc of the camera 63c in the fourth embodiment. The imaging range of the camera 63d in the fifth embodiment are set so as to include the essential range AR1 that satisfies both the clarity condition (1) and the field of view condition (2) described in the first embodiment. Therefore, in the HMD 100d in the fifth embodiment, as is similar to the HMD 100 in the first embodiment, in a case where the image which is in association with the position of the subject included in the captured image of the outside scene is displayed on the image display unit 20d, the image which can be visually recognized by the user clearly is displayed on the image display unit 20d in the range in which the user can visually recognize the outside scene clearly.

In addition, in the HMD 100d in the fifth embodiment, the stable fixation field of the user can be included in the angle of view of the cameras 63d as one imaging unit, and the region other than the stable fixation field can also be included. In addition, since the optical axis OLd of the camera 63d is perpendicular to the optical image display units 26 and 28, the deviation between the captured image and the display image becomes small, and thus, the image with less discomfort with respect to the outside scene is displayed on the image display unit 20d.

F. Sixth Embodiment

Figure 12:
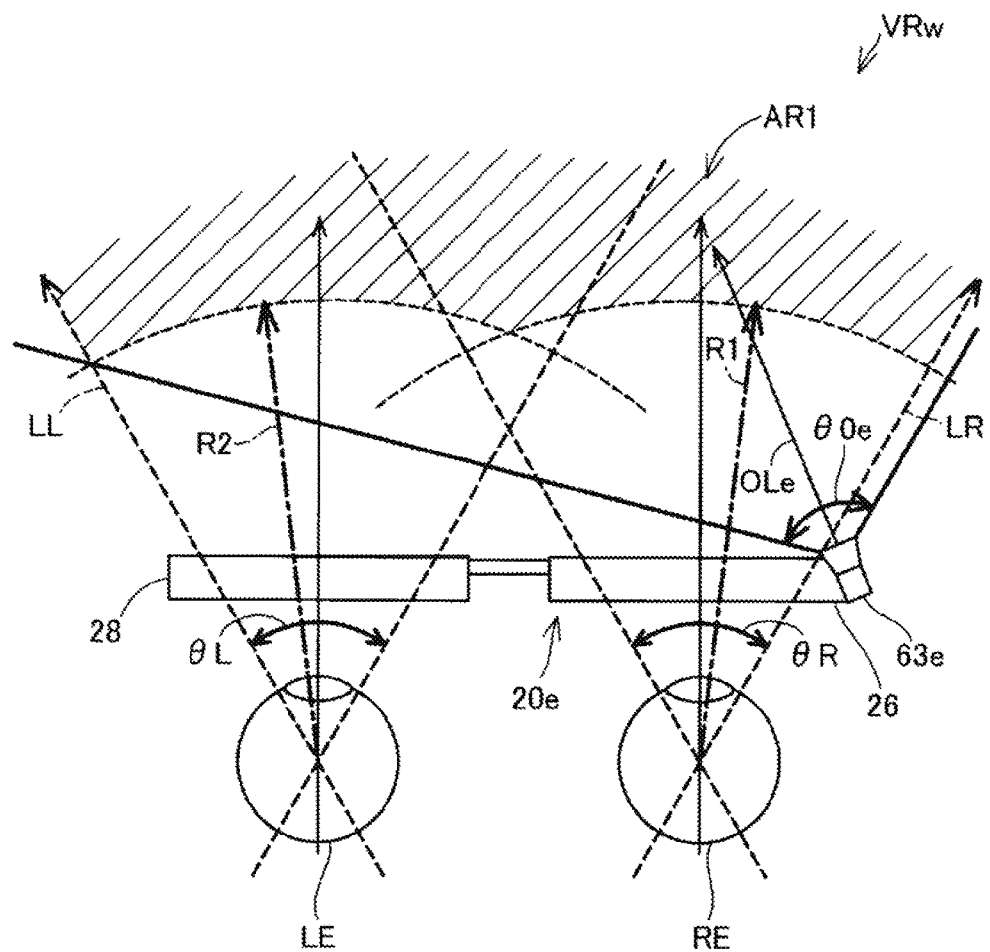
FIG. 12 is an explanatory diagram illustrating a relationship between the imaging range of a camera in the horizontal direction and the horizontal field of view of the user in the sixth embodiment.

FIG. 12 is an explanatory diagram illustrating a relationship between the imaging range of a camera 63e in the horizontal direction and the horizontal field of view VRw of the user in a sixth embodiment. As illustrated in FIG. 12, in the sixth embodiment, the direction of an optical axis OLe of a camera 63e and the angle of view θOe of the camera 63e are different from that in the fifth embodiment, and other configurations are the same as that in the fifth embodiment. In the sixth embodiment, the optical axis OLe of the camera 63e is facing the direction (inward) of the left optical image display unit 28 compared to the axis perpendicular to the optical image display units 26 and 28. In addition, the angle of view θOe of the camera 63e is smaller than the angle of view θOd of the camera 63d in the fifth embodiment. The imaging range of the camera 63e in the sixth embodiment is set so as to include the essential range AR1 that satisfies both the clarity condition (1) and the field of view condition (2) described in the first embodiment. Therefore, in the HMD 100e in the sixth embodiment, as is similar to HMD 100 in the first embodiment, in a case where the image which is in association with the position of the subject included in the captured image of the outside scene is displayed on the image display unit 20e, the image which can be visually recognized by the user clearly is displayed on the image display unit 20e in the range in which the user can visually recognize the outside scene clearly.

In addition, in the HMD 100e in the sixth embodiment, the stable fixation field of the user can be included in the angle of view of the cameras 63e as one imaging unit, and the region other than the stable fixation field can also be included.

G. Seventh Embodiment

Figure 13:
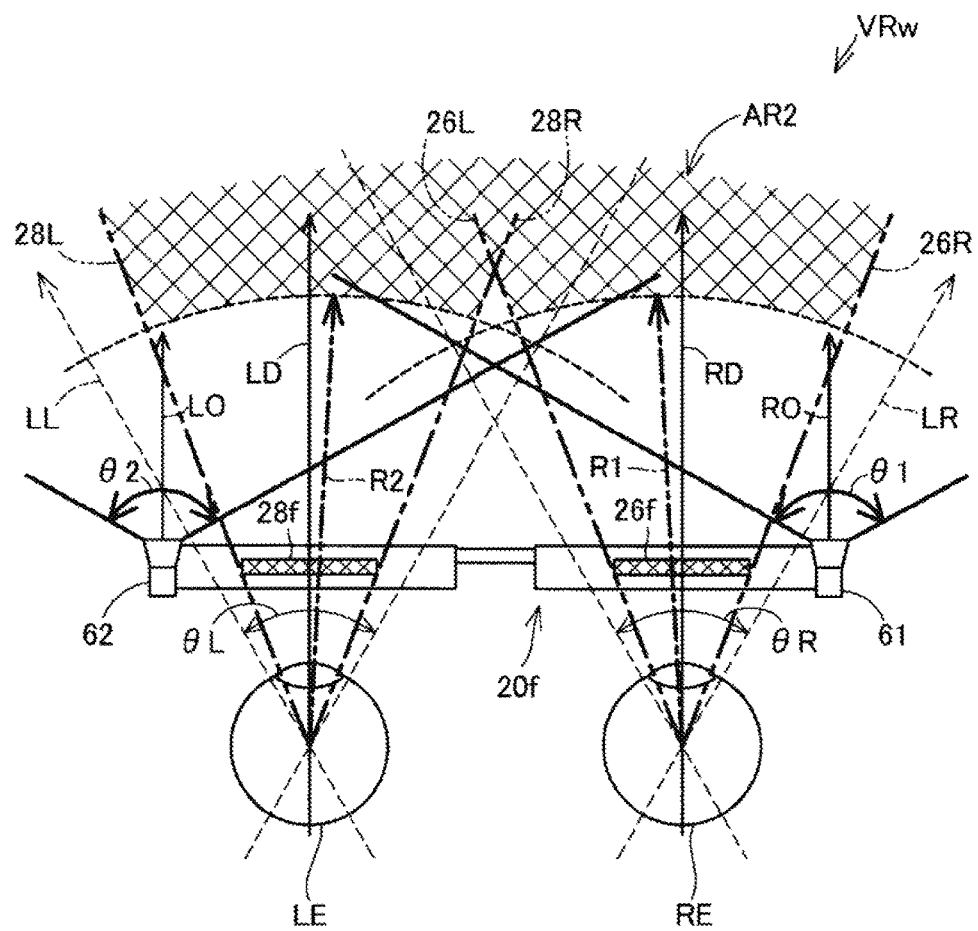
FIG. 13 is an explanatory diagram illustrating a relationship between the imaging range of a camera in the horizontal direction and the horizontal field of view of the user in the seventh embodiment.

FIG. 13 is an explanatory diagram illustrating a relationship between the imaging range of a camera 63f in the horizontal direction and the horizontal field of view VRw of the user in a seventh embodiment. In the seventh embodiment, the point different from that in the first embodiment is the fact that, in a case where the range in which optical image display units 26f and 28f can display the image is narrower than the field of view angles θR and θL (stable fixation field) of the user, the imaging ranges of the cameras 61 and 62 are set with considering the display condition (3) instead of the field of view condition (2) described in the first embodiment. In the seventh embodiment, the image setting unit 165f does not need to display the image which is in association with the subject which is not included in the displayable region on the optical image display units 26f and 28f, even if the subject can be included in the stable fixation field of the user. For this reason, in the seventh embodiment, as described below, the imaging ranges of the cameras 61 and 62 may be set so as to include the essential range AR2 that satisfies both the clarity condition (1) described in the first embodiment and the display condition (3) in the seventh embodiment.

(1) At least one of the cameras 61 and 62 capture the images in the range separated from the right eye RE by equal to or longer than the distance R1 and separated from the left eye LE by equal to or longer than the distance R2.

(2) At least one of the cameras 61 and 62 capture the image in the range of the image which can be displayable on the optical image display units 26f and 28f.

Therefore, in the seventh embodiment, the imaging range of the cameras 61 and 62 may be set such that the clarity condition (1) is satisfied and the range from a display right end 26R which is an end portion at the most right side of the right optical image display unit 26f to a display left end 28L which is an end portion at the most left side of the left optical image display unit 28f can be imaged, which is the display condition (3).

As described above, in the HMD 100f in the seventh embodiment, in a case where the imaging ranges of the cameras 61 and 62 are smaller than the field of view VR (for example, the stable fixation field) of the user set in advance, the range including the essential range AR2 which satisfies both the clarity condition (1) and the display condition (3) is imaged. For this reason, in the HMD 100f in the seventh embodiment, in the range in which the user can visually recognize the outside scene clearly and the image can be displayed on the image display unit 20f, the image which can be visually recognized by the user clearly is displayed on the image display unit 20f. Therefore, the cameras 61 and 62 do not need to capture the image of the unnecessary range of the outside scene, and thus, it is possible to provide the HMD 100f including the cameras 61 and 62 that meet the needs of the user.

H. Modification Example

The invention is not limited to the embodiments described above and various aspects can be embodied without departing from the spirit thereof. For example, the following modification can also be possible.

H-1. Modification Example 1

In the embodiments described above, one or two cameras are used as the imaging unit that images the outside scene. However, the number of cameras used as the imaging unit is not limited thereto, and three or more cameras may be used.

In the embodiments described above, the position of the right eye RE and left eye LE of the user who wears the image display unit 20 set in advance. However, the position of the right eye RE and left eye LE of the user with respect to the image display unit 20 can be variously modified. For example, the position of the right eye RE and left eye LE of the user may be changed based on an operation received by an operation unit 135. In addition, the angle of view of the camera is set based on the field of view with the viewpoint of the user as the center. However, not limited to this viewpoint, the angle of view of the camera may be set based on another viewpoint. For example, one point on a connection portion of the right optical image display unit 26 and the left optical image display unit 28 may be a center of the viewpoint. The angle of view of the camera may be set based on various ranges which can be visually recognized by the user.

In the embodiments described above, the angle of view or the optical axis of the camera is set with considering the field of view of the right eye RE and left eye LE. However, it is not necessary to consider the field of view of the right eye RE and left eye LE. For example, in a case where the image display maximum region PN in which the displayed image is visually recognized by the user corresponds to only one eye, the angle of view or the optical axis of the camera may be set with considering only the corresponding one eye. In addition, even when the image display unit 20 can cause the right eye RE and left eye LE to visually recognize the image, the angle of view or the optical axis of the camera may be set with causing the image to correspond to only one eye. As one eye described above, a dominant eye of the user can be selected. In addition, for example, as in a case where the effective field of view is included in the imaging range of the camera as the field of view of the right eye RE and the stable fixation field is included in the imaging range of the camera as the field of view of the left eye LE, the range of field of view included as the field of the right eye RE and the range of field of view included as the field of view of the left eye LE may be different from each other.

In the embodiments described above, the imaging range of the camera is set by setting both the optical axis and the angle of view of the camera. The imaging range of the camera may be set by setting only any one of the optical axis and the angle of view of the camera. In addition, the imaging range of the camera may be set by setting an element other than the optical axis and the angle of view of the camera. A position where the camera is disposed with respect to the image display unit 20 or the like can be an example of the element other than the optical axis and the angle of view of the camera.

In the embodiments described above, the stable fixation field is selected as the field of view in which the imaging range of the camera is subject to be included. However, other field of view may be selected and the angle of the selected field of view can be variously modified.

H-2. Modification Example 2

In the embodiment described above, the operation unit 135 is formed in the controller 10. However, the aspect of the operation unit 135 can be variously modified. For example, it may be an aspect having a user interface which is the operation unit 135 separate from the controller 10. In this case, since the operation unit 135 is separate from the controller 10 on which the power source 130 or the like is formed, it is possible to miniaturize the size, thereby improving the operability of the user. In addition, the cameras 61 and 62 are disposed on the image display unit 20. However, the camera 61 may be configured separate from the image display unit 20 so as to be able to capture the outside scene SC. In addition, in the HMD 100, both of the CPU 140 and the power source 130 that configure the controller 10 may be mounted on the image display unit 20. In this HMD 100, since there is no controller that is configured separate from the image display unit 20, it is possible to further miniaturize the size. In addition, by mounting the CPUs 140 on each of the controller 10 and the image display unit 20, the controller 10 may be used as a single-body controller and the image display unit 20 may be used as a single-body display device.

For example, the image light generation unit may be configured to include an organic electro-luminescence (organic EL) display and an organic EL control unit. In addition, for example, the image light generation unit can use, instead of an LCD, liquid crystal on silicon (LCOS®), a digital micro-mirror device, or the like. In addition, for example, it is also possible to apply the invention to a laser retina projection type HMD 100. In addition, the image display maximum region PN may be formed of a MEMS shutter type display which opens and closes the MEMS shutter formed in each pixel.

In addition, the HMD 100 may be a display using a MEMS display technology in which a scanning optical system using a MEM mirror is adopted as an image light generation unit. As a specific configuration, the HMD 100 may include a signal light generation unit, the scanning optical system having the MEMS mirror that scans light emitted from the signal light generation unit, and an optical member in which a virtual image is formed by the light scanned by the scanning optical system. When the HMD 100 includes the configuration described above, the light emitted from the signal light generation unit is reflected by the MEMS mirror and launched into and guided to the optical member, and reaches a virtual image forming surface (for example, a reflection surface). The virtual image is formed on the virtual image forming surface by the light being scanned by the MEMS mirror, and then, the user visually recognizes the formed virtual image. Thus, the user visually recognizes the image.

In addition, for example, the HMD 100 may be a head mounted display having an aspect in which an optical image display unit covers only a part of the eyes of the user, in other words, an aspect in which the optical image display unit does not completely cover the eyes of the user. In addition, the HMD 100 may be a so-called monocular type head mounted display. In addition, instead of the HMD 100, a hand held display may be used as the image display device such as binoculars, which is not mounted on the head of the user but in which the user fixes the position by hand. In addition, the HMD 100 is a binocular and optical transmission type. However, the invention can similarly be applied to a head mounted display device of another type such as a video transmission type.

In addition, the HMD 100 may be used as a display device only for displaying an image which is based on an image signal received from another device. Specifically, the HMD 100 may be used as a display device corresponding to a monitor of a desktop type PC. For example, by receiving an image signal from the desktop type PC, the image may be displayed on the image display maximum region PN of the image display unit 20.

In addition, the HMD 100 may be used so as to function as a part of the system. For example, the HMD 100 may be used as a device that executes a part of functions of a system including an aircraft. The system in which the HMD 100 is used is not limited to the system including the aircraft, but may be a system including a vehicle, a bicycle, or the like.

In addition, an ear-hook type earphone or a headband type earphone may be adopted, or the earphone may be omitted. In addition, for example, the head mounted display device may be configured so as to be mounted on a vehicle such as an automobile or an airplane. In addition, for example, the head mounted display device may be configured so as to be built in a body protector such as a helmet.

H-3. Modification Example 3

The configuration of the HMD 100 in the embodiments described above is only an example and various modifications can be made. For example, the direction key 16 provided on the controller 10 may be omitted or another operational interface such as an operational stick may be provided in addition to the direction key 16 and the track pad 14. In addition, the controller 10 has a configuration such that input devices such as a keyboard or a mouse can be connected. The controller 10 may receive the input from the keyboard or the mouse.

In addition, as an image display unit, instead of the image display unit 20 mounted like eyeglasses, for example, another type of image display unit such as an image display unit that is mounted like a cap may be adopted. In addition, the earphones 32 and 34 may appropriately be omitted. In addition, in the embodiments described above, the LCD and the light source are used for the configuration to generate the image light. However, instead thereof, another display element such as an organic EL display may be adopted.

Figure 14A:
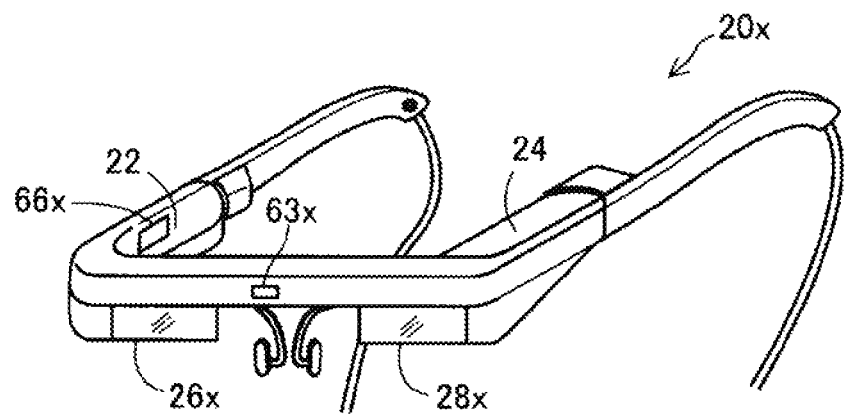
FIGS. 14A and 14B are explanatory diagrams illustrating an external configuration of an HMD in a modification example.
Figure 14B:
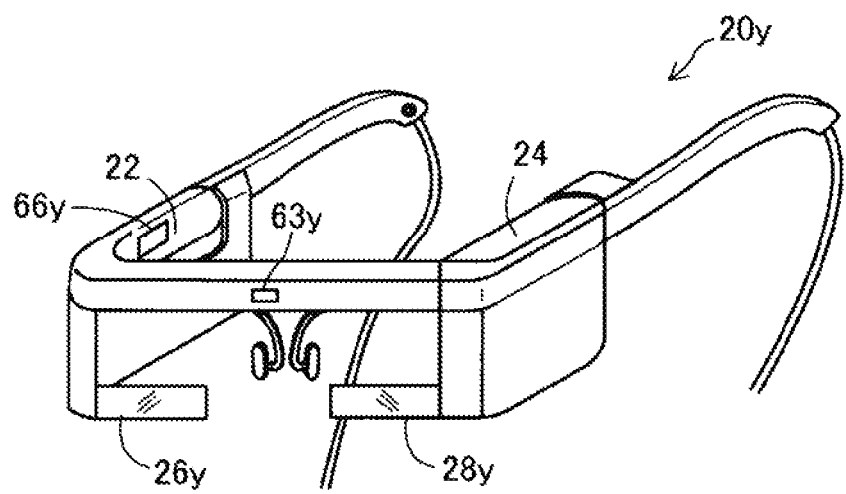

FIGS. 14A and 14B are explanatory diagrams illustrating an external configuration of the HMD in the modification example. In a case of an example in FIG. 14A, the configuration of the HMD in the modification example is different from the HMD 100 illustrated in FIG. 1 in a point that: an image display unit 20*x* includes a right optical image display unit 26*x* instead of the right optical image display unit 26, and includes a left optical image display unit 28*x* instead of the left optical image display unit 28. The right optical image display unit 26*x* is formed smaller than the optical member in the embodiment described above, and is disposed diagonally upward from the right eye of the user when mounting the HMD 100*x*. Similarly, the left optical image display unit 28*x* is formed smaller than the optical member in the embodiment described above, and is disposed diagonally upward from the left eye of the user when mounting the HMD 100*x*. In a case of an example in FIG. 14B, the configuration of the HMD in the modification example is different from the HMD 100 illustrated in FIG. 1 in a point that: an image display unit 20*y* includes a right optical image display unit 26*y* instead of the right optical image display unit 26, and includes a left optical image display unit 28*y* instead of the left optical image display unit 28. The right optical image display unit 26*y* is formed smaller than the optical member in the embodiment described above, and is disposed diagonally downward from the right eye of the user when mounting the head mounted display. The left optical image display unit 28*y* is formed smaller than the optical member in the embodiment described above, and is disposed diagonally downward from the left eye of the user when mounting the head mounted display. In this way, it is sufficient if the optical image display units are disposed in the vicinity of the eyes of the user. In addition, the size of the optical member that forms the optical image display unit is also optional, and thus, it is possible to implement the aspect of the HMD 100 such that the optical image display unit covers only a part of the eyes of the user, in other words, such that the unit does not completely cover the eyes of the user.

In addition, in the embodiments described above, the HMD 100 may guide an image light representing the same images to the right and left eyes of the user such that the user visually recognizes two-dimensional images, or may guide an image light representing the different images to the right and left eyes of the user such that the user visually recognizes three-dimensional images.

In addition, in the embodiments described above, a part of the configuration that is implemented by hardware may be replaced by software, or conversely, a part of the configuration that is implemented by software may be replaced by hardware. For example, in the embodiment described above, the functions of the image processing unit 160 and the voice processing unit 170 are implemented by the CPU 140 reading and executing the computer program. However, theses function units may be implemented by a hardware circuit.

In addition, in a case where a part or all of the functions of the invention is implemented by software, the software (computer program) can be provided in the form of being stored in a computer-readable storage medium. In the invention, "the computer-readable storage medium" is not limited to a portable type storage medium such as a flexible disk or CD-ROM but includes an internal storage device in a computer such as various RAM, ROM or the like or an external storage device fixed to the computer such as a hard disk.

In addition, in the embodiments described above, as illustrated in FIG. 1 and FIG. 2, the controller 10 and the image display unit 20 are configured to be separated from each other. However, the configuration of the controller 10 and the image display unit 20 is not limited thereto and various modifications can be made. For example, all of the configurations formed in the controller 10 may be formed in the image display unit 20 or a part thereof may be formed in the image display unit 20. In addition, the power source 130 in the embodiment described above may have a configuration of being independently formed and being replaceable, or the power source 130 may be formed in a duplicated manner in the image display unit 20 in addition to the configuration of being formed in the controller 10. For example, the CPU 140 illustrated in FIG. 2 may be formed on both of the controller 10 and the image display unit 20, or the functions performed by the CPU 140 formed in the controller 10 and the CPU formed in the image display unit 20 may be separately divided.

The invention is not limited to the embodiments and the modification examples described above and can be implemented by various modifications without departing from the spirit of the invention. For example, the technical features in the embodiments and the modification examples corresponding to the technical features in each aspect described in the SUMMARY can appropriately be replaced or combined in order to solve a part or all of the problems described above, or in order to achieve a part or all of the effects described above. In addition, if the technical features are not described as essential herein, the technical features may appropriately be deleted.

The entire disclosure of Japanese Patent Application No. 2015-013125, filed Jan. 27, 2015 is expressly incorporated by reference herein.

What is claimed is:

1. A transmission type head mounted display device comprising:
   a first camera that images an outside scene;
   a second camera that images a user's eyes;
   a display that is capable of transmitting the outside scene; and
   a processor programmed to:
      receive an image captured by the second camera, the captured image including the user's eyes;
      determine, based on the captured image, a gazing point of a user;
      determine a distance from the user to the gazing point of the user based on a focal length of the user and an estimated field of view of the user as a field of view of the user who wears the transmission type head mounted display device; and
      adjust a position of the camera, based on the determined distance, so as to set an imaging range of the camera.

2. The transmission type head mounted display device according to claim 1, wherein the estimated field of view is a region set with a position having a field of view that is set with a position of eyes of the user as a center.

3. The transmission type head mounted display device according to claim 2, wherein the estimated field of view is set as a stable fixation field of the user.

4. The transmission type head mounted display device according to claim 2, wherein the estimated field of view is determined based on a right eye set field of view of which a center is a set right eye position which is set as a position of the right eye of the user who wears the transmission type head mounted display device and a left eye set field of view of which a center is a set left eye position which is set as a position of the left eye of the user who wears the transmission type head mounted display device.

5. The transmission type head mounted display device according to claim 1, wherein
   the display includes an image display region in which an image can be displayed, and
   in a case where a region formed by the estimated field of view at the position of the image display region with the estimated position of the eyes of the user as a base point is greater than the image display region, the processor is programmed to set an imaging range based on the image display region.

6. The transmission type head mounted display device according to claim 1, wherein the processor is further programmed to: set a distance to a display position where a three-dimensional image is visually recognized by the user to be equal to or longer than the determined distance, in a case where the three-dimensional image which is visually recognized by the user is stereoscopically displayed on the display.

7. The transmission type head mounted display device according to claim 1, wherein
   the second camera is mounted on the transmission type head mounted display device, and
   the processor is programmed to: determine an imaging range that could be set by adjusting at least one of angles of view and directions of optical axes of the camera.

8. A control method for a head mounted display device including a first camera that images an outside scene, a second camera that images a user's eyes, and a display that is capable of transmitting the outside scene, the method comprising:
   receiving an image captured by the second camera, the captured image including a user's eyes;
   determining, based on the captured image, a gazing point of a user;
   determining a distance from the user to the gazing point of the user based on a focal length of the user and an estimated field of view of the user as a field of view of the user who wears the transmission type head mounted display device; and
   adjusting a position of the camera, based on the determined distance, so as to set an imaging range of the camera.

9. A non-transitory computer readable medium comprising computer program instructions for a head mounted display device including a first camera that images an outside scene, a second camera that images a user's eyes, and a display that is capable of transmitting the outside scene, the computer program instructions, when executed by a processor, causing the processor to:
   receive an image captured by the second camera, the captured image including a user's eyes;
   determine, based on the captured image, a gazing point of a user;
   determine a distance from the user to the gazing point of the user based on a focal length of the user and an estimated field of view of the user as a field of view of the user who wears the transmission type head mounted display device; and adjust a position of the camera, based on the determined distance, so as to set an imaging range of the camera.

* * * * *